(12) United States Patent
Jaquette

(10) Patent No.: US 9,317,720 B2
(45) Date of Patent: Apr. 19, 2016

(54) METHOD, SYSTEM, AND PROGRAM FOR SECURELY PROVIDING KEYS TO ENCODE AND DECODE DATA IN A STORAGE CARTRIDGE

(75) Inventor: Glen Alan Jaquette, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 180 days.

(21) Appl. No.: 12/912,740

(22) Filed: Oct. 26, 2010

(65) Prior Publication Data
US 2011/0040986 A1  Feb. 17, 2011

Related U.S. Application Data

(63) Continuation of application No. 09/977,159, filed on Oct. 11, 2001, now Pat. No. 7,865,440.

(51) Int. Cl.
*G06Q 20/00* (2012.01)
*G06F 21/80* (2013.01)
*G06F 21/62* (2013.01)

(52) U.S. Cl.
CPC .......... *G06F 21/805* (2013.01); *G06F 21/6218* (2013.01); *G06F 21/80* (2013.01); *G06F 2221/2121* (2013.01)

(58) Field of Classification Search
None
See application file for complete search history.

(56) References Cited

U.S. PATENT DOCUMENTS

| 4,688,169 A | 8/1987 | Joshi |
| 4,736,422 A | 4/1988 | Mason |
| 4,796,220 A | 1/1989 | Wolfe |
| 4,799,061 A | 1/1989 | Abraham et al. |
| 4,866,769 A | 9/1989 | Karp |
| 5,023,907 A | 6/1991 | Johnson et al. |
| 5,121,483 A * | 6/1992 | Monahan et al. ............... 710/40 |
| 5,285,497 A | 2/1994 | Thatcher, Jr. |
| 5,319,710 A | 6/1994 | Atalla et al. |
| 5,321,749 A | 6/1994 | Virga |
| 5,325,430 A | 6/1994 | Smythe et al. |
| 5,337,357 A | 8/1994 | Chou et al. |

(Continued)

FOREIGN PATENT DOCUMENTS

| EP | 924895 | 6/1999 |
| WO | 9848389 | 10/1998 |

OTHER PUBLICATIONS

Microsoft Corp., "Encrypting File System for Windows 2000", Copyright 1998 Microsoft Corporation.

(Continued)

*Primary Examiner* — John Hayes
*Assistant Examiner* — John M Winter
(74) *Attorney, Agent, or Firm* — David W. Victor; Konrad Raynes Davda & Victor LLP

(57) ABSTRACT

Provided is a method, system, and program for enabling access to data in a storage medium within one of a plurality of storage cartridges capable of being mounted into a interface device. An association is provided of at least one coding key to a plurality of storage cartridges. A determination is made of one coding key associated with one target storage cartridge, wherein the coding key is capable of being used to access data in the storage medium within the target storage cartridge. The determined coding key is encrypted. The coding key is subsequently decrypted to use to decode and code data stored in the storage medium.

22 Claims, 14 Drawing Sheets

(56) References Cited

U.S. PATENT DOCUMENTS

| | | | |
|---|---|---|---|
| 5,398,283 | A | 3/1995 | Virga |
| 5,416,840 | A | 5/1995 | Cane et al. |
| 5,416,841 | A | 5/1995 | Merrick |
| 5,448,698 | A | 9/1995 | Wilkes et al. |
| 5,450,489 | A | 9/1995 | Ostrover et al. |
| 5,479,512 | A | 12/1995 | Weiss |
| 5,642,421 | A | 6/1997 | Gray et al. |
| 5,719,938 | A | 2/1998 | Haas et al. |
| 5,737,422 | A | 4/1998 | Billings |
| 5,745,568 | A | 4/1998 | O'Connor et al. |
| 5,748,744 | A | 5/1998 | Levy et al. |
| 5,805,700 | A | 9/1998 | Nardone et al. |
| 5,809,143 | A | 9/1998 | Hughes |
| 5,809,145 | A | 9/1998 | Slik et al. |
| RE36,181 | E | 4/1999 | Koopman, Jr. et al. |
| 5,915,021 | A | 6/1999 | Herlin et al. |
| 5,926,624 | A | 7/1999 | Katz et al. |
| 5,949,877 | A | 9/1999 | Traw et al. |
| 5,956,407 | A | 9/1999 | Slavin |
| 5,963,642 | A | 10/1999 | Goldstein |
| 5,974,144 | A | 10/1999 | Brandman |
| 5,991,399 | A | 11/1999 | Graunke et al. |
| 5,991,403 | A | 11/1999 | Aucsmith et al. |
| 6,023,506 | A | 2/2000 | Ote et al. |
| 6,098,056 | A * | 8/2000 | Rusnak et al. .......... 705/75 |
| 6,104,561 | A | 8/2000 | Braithwaite et al. |
| 6,218,970 | B1 | 4/2001 | Jaquette |
| 6,468,160 | B2 | 10/2002 | Eliott |
| 6,606,707 | B1 | 8/2003 | Hirota et al. |
| 6,702,672 | B1 | 3/2004 | Angell et al. |
| 6,779,115 | B1 | 8/2004 | Naim |
| 6,898,296 | B2 | 5/2005 | Itoh |
| 6,915,434 | B1 * | 7/2005 | Kuroda et al. .......... 713/193 |
| 7,003,111 | B2 | 2/2006 | Jaquette |
| 2001/0042043 | A1 * | 11/2001 | Shear et al. .......... 705/51 |
| 2002/0157011 | A1 | 10/2002 | Thomas, III |
| 2003/0070083 | A1 | 4/2003 | Nessler |
| 2004/0162137 | A1 | 8/2004 | Elliott |
| 2004/0181488 | A1 | 9/2004 | Oshima et al. |
| 2004/0252604 | A1 | 12/2004 | Johnson et al. |

OTHER PUBLICATIONS

IBM, Corp., "Fast Hardware Data Compression Algorithm and Some Algorithmic Extensions", Journal of Research and Development, vol. 42, No. 6, 1998, pp. 1-13.

H.A. Lewis, et al., "Lempel-Ziv Encoding", in: Data Structures & Their Algorithms, Harper Collins Publishers 1991.

"Adaptive Lossless Data Compression (ALDC)", Quarter-Inch Cartridge Drive Standards Inc., QIC-154, Revision A, Mar. 10, 1994.

Streaming Lossless Data Compression Algorithm—(SLDC), ECMA Standardizing Information and Communication System, Second Draft, Dec. 2000.

Zu-Hua "Public-Key Cryptosystem Over Ring Z", Electronics Letters, vol. 24, Issue 2, Jan. 2, 1988.

X. Yang, et al., "Key Distribution System for Digital Video Signal", Signal Processing, 1996, 3rd International Conference on . . . , vol. 2, Oct. 14-18, 1996.

A. Torrubia, et a., "Perceptual Cryptography on MPEG-1 Layer III Bit-Streams", Consumers Electronics, 2002, ICCE, 2002 Digest of Technical Papers, International Confernce on . . . , Jun. 18-20, 2002.

Office Action dated Nov. 16, 2004 for U.S. Appl. No. 09/977,159, filed Oct. 11, 2001.

Response dated Feb. 16, 2005 to Office Action dated Nov. 16, 2004 for U.S. Appl. No. 09/977,159, filed Oct. 11, 2001.

Final Office Action dated Jun. 6, 2005 for U.S. Appl. No. 09/977,159, filed Oct. 11, 2001.

Response dated Jul. 29, 2005 to Final Office Action dated Jun. 6, 2005 for U.S. Appl. No. 09/977,159, filed Oct. 11, 2001.

RCE and Amendment dated Aug. 6, 2005 to Final Office Action dated May 12, 2006 for U.S. Appl. No. 09/977,159, filed Oct. 11, 2001.

Office Action dated Nov. 8, 2005 for U.S. Appl. No. 09/977,159, filed Oct. 11, 2001.

Response dated Feb. 8, 2006 to Office Acction dated Nov. 8, 2005 for U.S. Appl. No. 09/977,159, filed Oct. 11, 2001.

Final Office Action dated May 12, 2006 for U.S. Appl. No. 09/977,159, filed Oct. 11, 2001.

Response dated Jul. 15, 2006 to Final Office Action dated May 12, 2006 for U.S. Appl. No. 09/977,159, filed Oct. 11, 2001.

Notice of Appeal and Pre-Brief Appeal Conference Request, dated Sep. 13, 2006.

Appeal Brief dated Jan. 10, 2007.

Office Action dated Apr. 6, 2007 for U.S. Appl. No. 09/977,159, filed Oct. 11, 2001.

Response dated Jun. 23, 2007 to Office Action dated Apr. 6, 2007 for U.S. Appl. No. 09/977,159, filed Oct. 11, 2001.

Office Action dated Sep. 20, 2007 for U.S. Appl. No. 09/977,159, filed Oct. 11, 2001.

Response dated Dec. 20, 2007 to Office Action dated Sep. 20, 2007 for U.S. Appl. No. 09/977,159, filed Oct. 11, 2001.

Final Office Action dated Mar. 24, 2008 for U.S. Appl. No. 09/977,159, filed Oct. 11, 2001.

Response dated Jun. 24, 2008 to Office Action dated Mar. 24, 2008 for U.S. Appl. No. 09/977,159, filed Oct. 11, 2001.

Notice of Appeal and Pre-Brief Conference Request, dated Jul. 24, 2008.

RCE and Amendment dated Sep. 3, 2008.

Office Action dated Nov. 18, 2008 for U.S. Appl. No. 09/977,159, filed Oct. 11, 2001.

Response dated Mar. 18, 2009 to Office Action dated Nov. 18, 2008 for U.S. Appl. No. 09/977,159, filed Oct. 11, 2001.

Notice of Appeal and Pre-Brief Conference Request, dated Sep. 25, 2009.

Appeal Brief dated Nov. 11, 2009.

NOA dated May 5, 2010 for U.S. Appl. No. 09/977,159, filed Oct. 11, 2001.

RCE, Amendment and IDS dated Aug. 4, 2010 in response to NOA dated May 5, 2010 for U.S. Appl. No. 09/977,159, filed Oct. 11, 2001.

NOA dated Aug. 18, 2010 for U.S. Appl. No. 09/977,159, filed Oct. 11, 2001.

Fourth Final Office Action dated Jun. 24, 2009, pp. 1-15, for U.S. Appl. No. 09/977,159, filed Oct. 11, 2001 by inventor G.A. Jaquette.

Notice of Allowance, dated Jun. 16, 2005, pp. 1-6, for U.S. Appl. No. 09/977,161, filed Oct. 11, 2001 by inventor G.A. Jaquette.

* cited by examiner

MRU Key

Scrambled
MRU Key

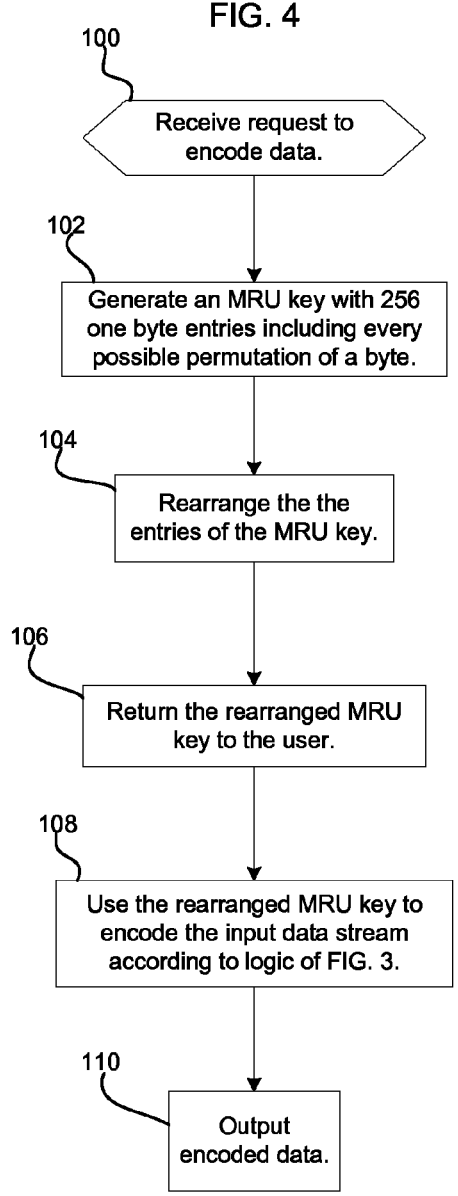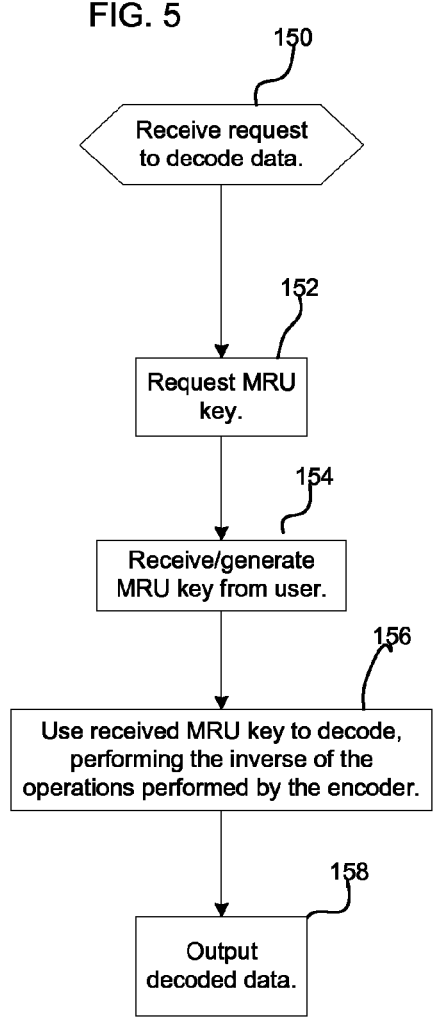

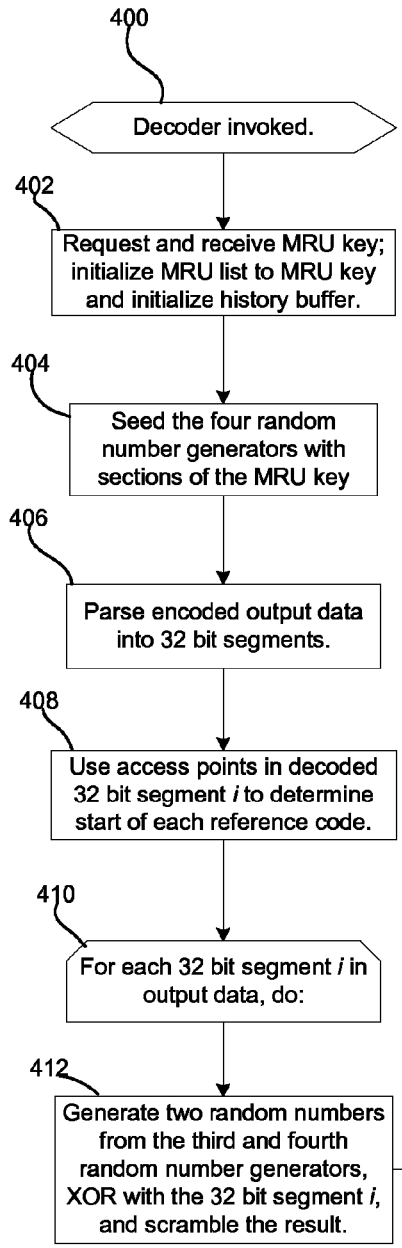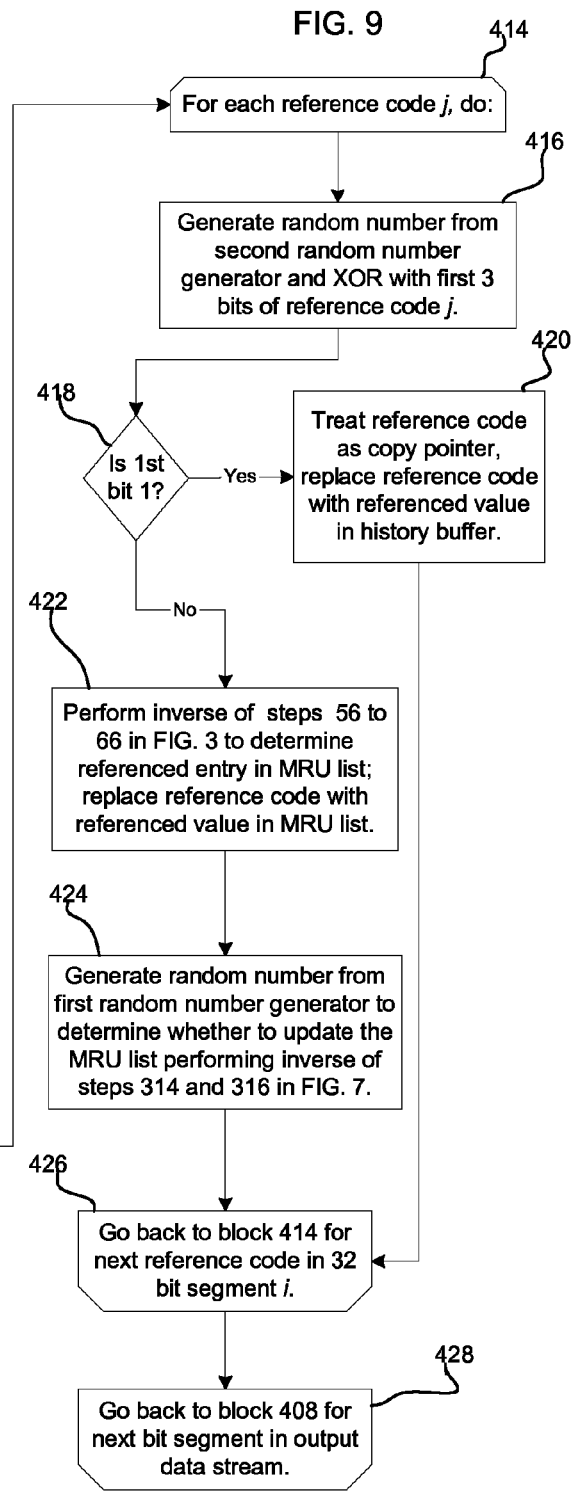
FIG. 9

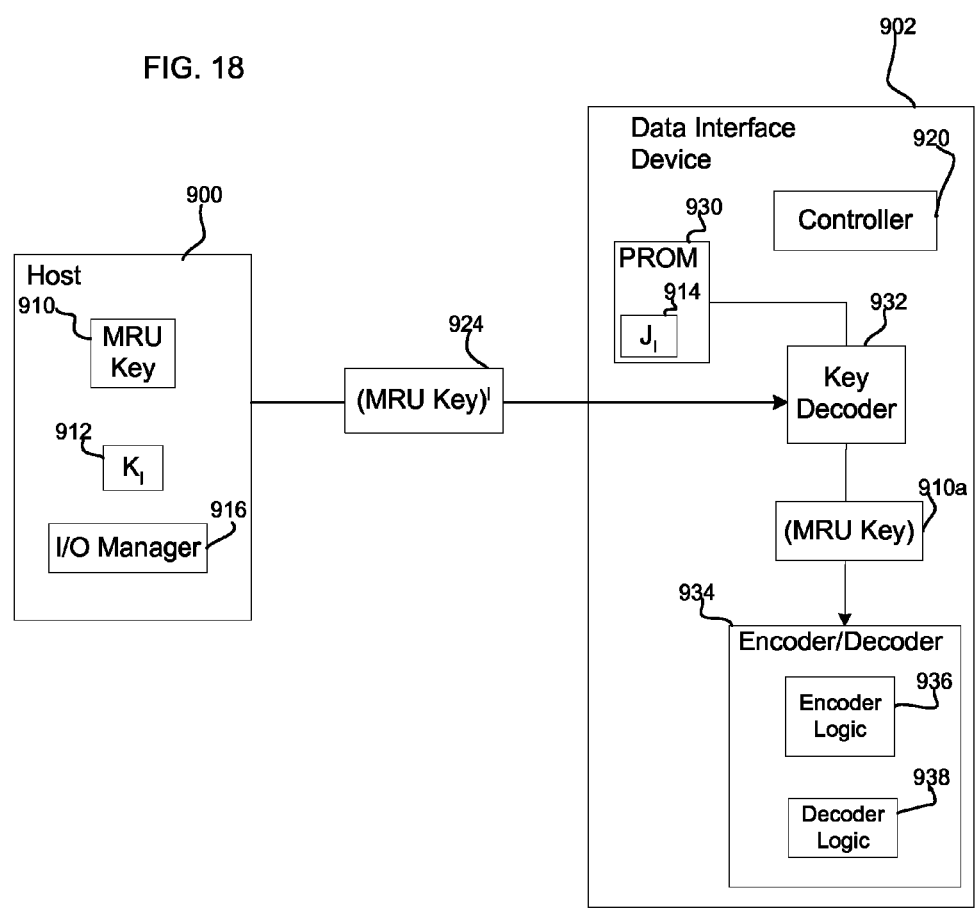

METHOD, SYSTEM, AND PROGRAM FOR SECURELY PROVIDING KEYS TO ENCODE AND DECODE DATA IN A STORAGE CARTRIDGE

This application is a continuation of U.S. patent application Ser. No. 09/977,159, filed on Oct. 11, 2001, which patent application is incorporated herein by reference in its entirety.

RELATED APPLICATION

This application is related to the copending and commonly assigned patent application Ser. No. 09/977,161 entitled "Method, System, and Program for Encoding and Decoding Input Data", which patent application is incorporated herein by reference in its entirety.

BACKGROUND OF THE INVENTION

1. Field of the Invention

The present invention relates to a method, system, and program for securely providing keys to encode and decode data in a storage cartridge.

2. Description of the Related Art

Protecting and securing data is one of the primary concerns that must be addressed when designing an information management system, whether for a single user, small business or large scale data warehouse. Oftentimes data may be continually archived on various storage medium, such as tape cassettes or optical disks. When archiving data on tape or other removable storage medium, one security concern is that someone will steal the tape and then access the data. Also, if the tape can be mounted into a tape drive through remote commands transmitted over a network, then there is a concern that someone may "hack" into the system, mount the tape or other storage medium in a drive and then access the data.

One technique to secure data is to encrypt the data on the tape. However, data on an archival medium, such as tape or optical disk tape is often compressed. Performing encryption and compression as well as decompression and decryption on very large data sets, such as an entire tape cartridge which can comprise 100 gigabytes (GB), can be computationally expensive and take a considerable amount of time.

Moreover, the compression and encryption operations are usually performed sequentially in separate steps. The data is first compressed and then encrypted because encrypted data cannot typically be compressed. Performing compression and encryption sequentially requires scanning the data twice, which requires still further computational resources and time. Still further, compression may be performed by dedicated integrated circuits, whereas most popular encryption algorithms, such as the public/private key encryption and cipher schemes, are typically implemented using software, which is slower than using a dedicated integrated circuit.

Another security technique for removable storage media is to program the drive controller that controls the read/write head that physically accesses the storage medium to only allow access to a password protected removable cartridge if the user enters the password. For instance, with the JAZ and ZIP storage cartridges produced by Iomega Corporation**, the user may password protect the storage cartridge. In such case, the controller in the Iomega drive interface is programmed to only allow access to the data on the storage cartridge if the user enters the password assigned to that storage cartridge. This process is further described in U.S. Pat. No. 6,104,561. The security feature of such storage cartridges is very fast because the data itself does not have to be decrypted. Instead, the drive provides immediate access to the data upon receiving the recognizable password. Although such a system may prevent hackers from access a mounted drive remotely over a network, someone who physically misappropriates the password protected cartridge can still read the data on the storage medium because the data is not encrypted on the storage medium. All one would have to instruct the interface controller to ignore the password feature and access the data.

Thus, there is a need in the art for improved protection schemes in a data storage system using removable storage media.

SUMMARY OF THE PREFERRED EMBODIMENTS

Provided is a method, system, and program for enabling access to data in a storage medium within one of a plurality of storage cartridges capable of being mounted into a interface device. An association is provided of at least one coding key to a plurality of storage cartridges. A determination is made of one coding key associated with one target storage cartridge, wherein the coding key is capable of being used to access data in the storage medium within the target storage cartridge. The determined coding key is encrypted. The coding key is subsequently decrypted to use to decode and code data stored in the storage medium.

In further implementations, the association of the at least one coding key to the plurality of storage cartridges associates a different key with each storage cartridge, wherein the key associated with one storage cartridge is used to code data written to and decode data read from the storage medium of the storage cartridge.

Still further, the encrypted coding key is transmitted to the interface device, wherein the interface device decrypts the coding key to use to decode and code data stored in the storage medium. In such implementations, the coding key is encrypted by encrypting the coding key with a first key, wherein a second key used by the interface device is capable of decrypting the coding key encrypted with the first key.

Further provided is a method, system, and program for accessing data in a removable storage cartridge including a storage medium. An encrypted coding key is received from a host system and decrypted. The coding key is used to encode data written to the storage medium and decode data read from the storage medium.

In such implementations, encoding the data with the coding key may compress the data and wherein decoding the data written to the storage medium may decompress the data, wherein the data can only be encoded or decoded using the coding key.

Still further, the coding key is encrypted by a first key maintained at the host system. In such case, a second key is maintained that is capable of decrypting data encrypted using the first key, wherein the second key is used to decrypt the coding key encrypted with the first key.

The described implementations provide a technique for securely managing coding keys that are used to encode and decode data in storage cartridges. The coding keys themselves are encrypted to prevent unauthorized access to the coding key, which could then be used to decode and access the data in the storage cartridges.

BRIEF DESCRIPTION OF THE DRAWINGS

Referring now to the drawings in which like reference numbers represent corresponding parts throughout:

FIGS. 2a, b illustrate keys used to encode data in accordance with implementations of the invention;

FIGS. 4 and 5 illustrate logic for the user to generate and maintain a key to encode and decode the data in accordance with implementations of the invention;

FIG. 9 illustrates logic to decode data encoded by the logic of FIGS. 7 and 8 in accordance with implementations of the invention;

FIG. 18 illustrates a hardware arrangement of an interface device in accordance with implementations of the invention.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention

Figure 1:
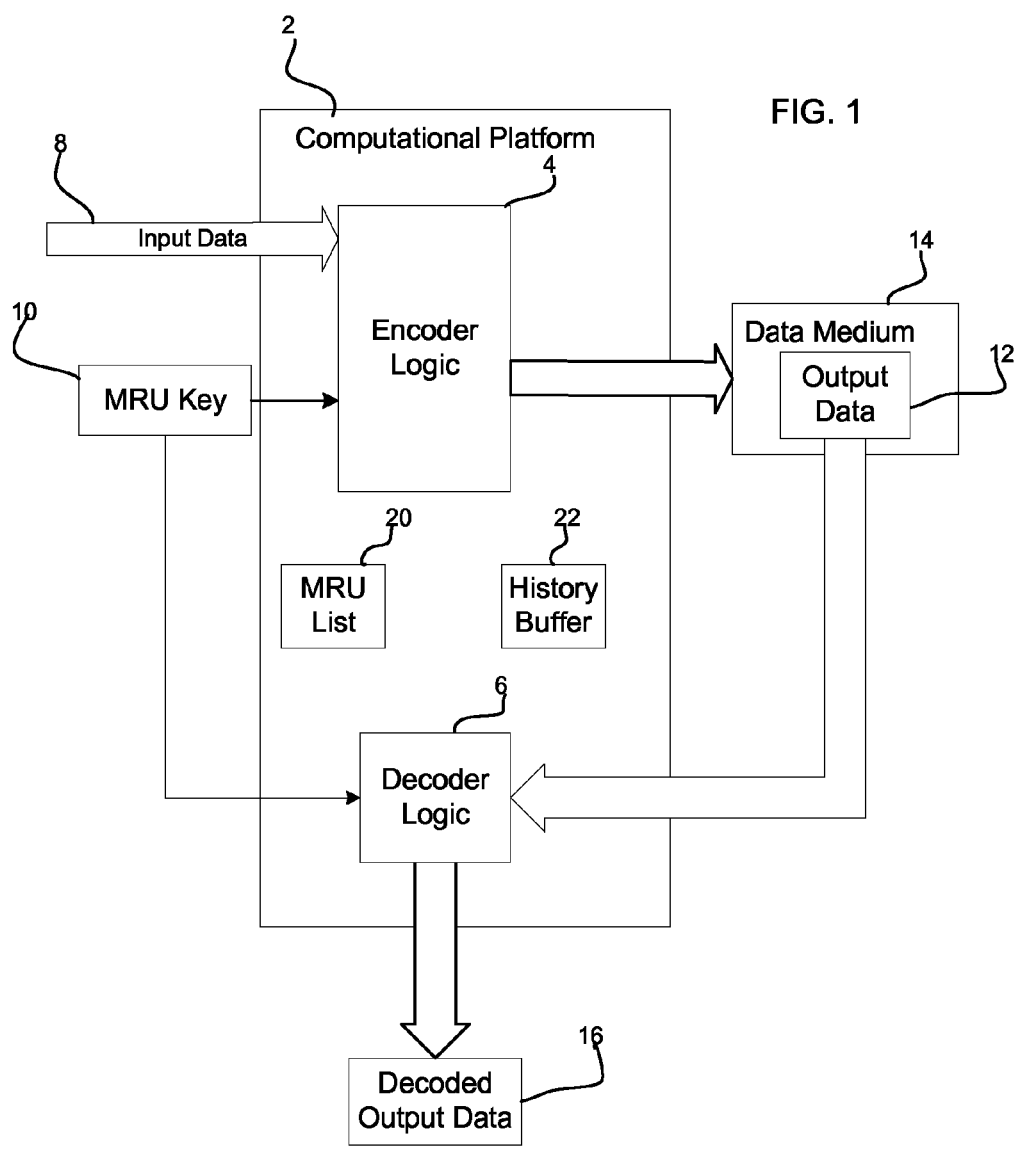
FIG. 1 illustrates a computing environment in accordance with the preferred embodiments of the present invention.

Generating an Encryption/Compression Key to Use to Encrypt and Compress Data FIG. 1 illustrates a computing environment in which aspects of the invention are implemented. A computational platform 2 includes encoder logic 4 and decoder logic 6. The computational platform may comprise a dedicated integrated circuit, such as an Application Specific Integrated Circuit (ASIC) or other digital hardware component in which the encoder logic 4 and decoder logic 6 are implemented. Additionally, the computational platform 2 may comprise a processor based platform in which the encoder 4 and decoder 6 logic are implemented as code in a computer readable medium and executed by a processor (not shown).

The encoder logic 4 receives an input data stream 8 and a Most Recently Used (MRU) key 10, such as that shown in FIG. 2b. FIG. 2a illustrates an implementation of the MRU key 10' comprising a 256 byte key that has 256 one byte entries. The MRU key 10' includes every possible one byte value. In FIG. 2a, the MRU key 10' entries are shown in increasing order. In certain implementations, as shown in FIG. 2b, the ordering of the entries in the initial MRU key 10 are scrambled in a random manner to avoid an obvious pattern, such as an increasing order, to produce a scrambled MRU key 10. Such a scrambled MRU key 10 can be used as an encryption/decryption key to the data.

In FIG. 1, the encoder logic 4 uses the scrambled MRU key 10 to generate compressed and encrypted output data 12 in the manner described below. The encoded output data 12 is maintained in a computer readable data medium 14, which may comprise a magnetic, optical, or electronic storage; or comprise a data transfer medium such as signals propagating through space or through a network. The decoder logic 6 receives as input the scrambled MRU key 10 and the compressed/encrypted output data 12, and generates decoded output data 16, e.g., decompressed and decrypted, that comprises the input data stream, with the exception that if the encoder 4 and decoder 6 logic use lossy compression algorithms, some of the original input data 8 may have been simplified to the point where some detail was lost.

In certain implementations, the encoder logic 4 uses a lossless Lempel-Ziv (LZ) variable length encoding procedure. In one implementation, the encoder 4 uses the LZ1 Adaptive Lossless Data Compression (ALDC) algorithm. The LZ1 algorithm achieves data compression by using a history buffer that the encoder 4 and decoder 6 initialize and update in the same manner. In LZ1, if a string, i.e., two or more sequential bytes, in the input data 8 currently being scanned matches one previously scanned string which is still in the sliding history buffer, the encoder 4 replaces the currently scanned string with a reference, referred to as a copy pointer, to the previously scanned string in the history buffer, specifying a location and a byte count or length. Because the copy pointer can comprise fewer bits than the string being replaced, compression is achieved. If a byte is encountered which cannot be output as a continuation of a previous copy pointer, or as a first byte of a new copy pointer, it is output instead separately in what is called a literal. A literal in standard ALDC is simply the input byte prepended with a "0" to distinguish it from a copy pointer, to which is prepended with a "1". A literal byte is output for those bytes in the input data 8 that were not part of strings replaced with references or pointers to a matching string value in a sliding history buffer, in the case of LZ1 compression, or a compression dictionary, in the case of LZ2 compression.

In certain implementations, the encoder 4 logic encodes the literal bytes not part of strings replaced with copy pointers using the compression scheme described in the commonly assigned U.S. Pat. No. 6,218,940 entitled "Literal Handling in LZ Compression Employing MRU/LRU Encoding", which patent is incorporated herein by reference in its entirety. To compress the literals, the encoder 4 maintains an MRU list 20, which in its initial state is set to the MRU key 10. Upon scanning a literal, the encoder 4 determines the entry in the MRU list 20 having the byte value matching the input byte value. The encoder 4 then replaces the scanned literal with a reference addressing the entry in the MRU list 20 including the matching byte value. The matching value in the referenced entry of the MRU list 20 is then promoted to the top, or most recently used end, of the MRU list 20, where its reference address changes to the first entry in the MRU list 20.

To compress the input data 8 stream using LZ1 compression techniques, the encoder 4 maintains a sliding history buffer 22, which includes the strings in the input data 8 referenced by the generated copy pointers. To decode data, the decoder 6 would identically update and utilize the MRU list 20 and history buffer 22 when performing the inverse operations of the encoder 4 to replace the copy pointers referencing the history buffer 22 with the referenced string and replace references to the MRU list 20 with the byte value in the referenced entry in the MRU list 20 to produce the original input data 8 as part of a decoding operation.

In certain implementation, all copy pointers are signified as such by a prepended binary "1". The encoder 4 replaces a literal byte with one of the following values:

If the entry in the MRU list 20 including the byte value matching the literal is one of the first 64 entries, then the reference code comprises "00" plus a 6 bit address identifying the referenced entry in the first 64 entries of the MRU list 20, which comprises an eight bit reference code.

If the referenced entry in the MRU list 20 including the byte value matching the literal is one of the $65^{th}$ to $128^{th}$ entries, then the reference code comprises "010" plus a 6 bit address identifying the referenced entry in the $65^{th}$ to $128^{th}$ entries of the MRU list 20, which comprises a nine bit reference code.

If the referenced entry in the MRU list 20 including the byte value matching the literal is one of the $129^{th}$ to $256^{th}$ entries, then the reference code comprises "011" plus a 7 bit address identifying the referenced entry in the $129^{th}$ to $256^{th}$ entries of the MRU list 20, which comprises a ten bit reference code.

The above described scheme for coding the references to the MRU list 20 that replace the literals in the input data 8 optimize compression, because the fewest number of bits, 8, are used to represent the most used MRU list 20 entries, the next fewest number of bits, 9, are used to represent the next most used MRU list 20 entries, and the most number of bits, 10, are used to represent the least recently used MRU list 20 entries.

Figure 3:
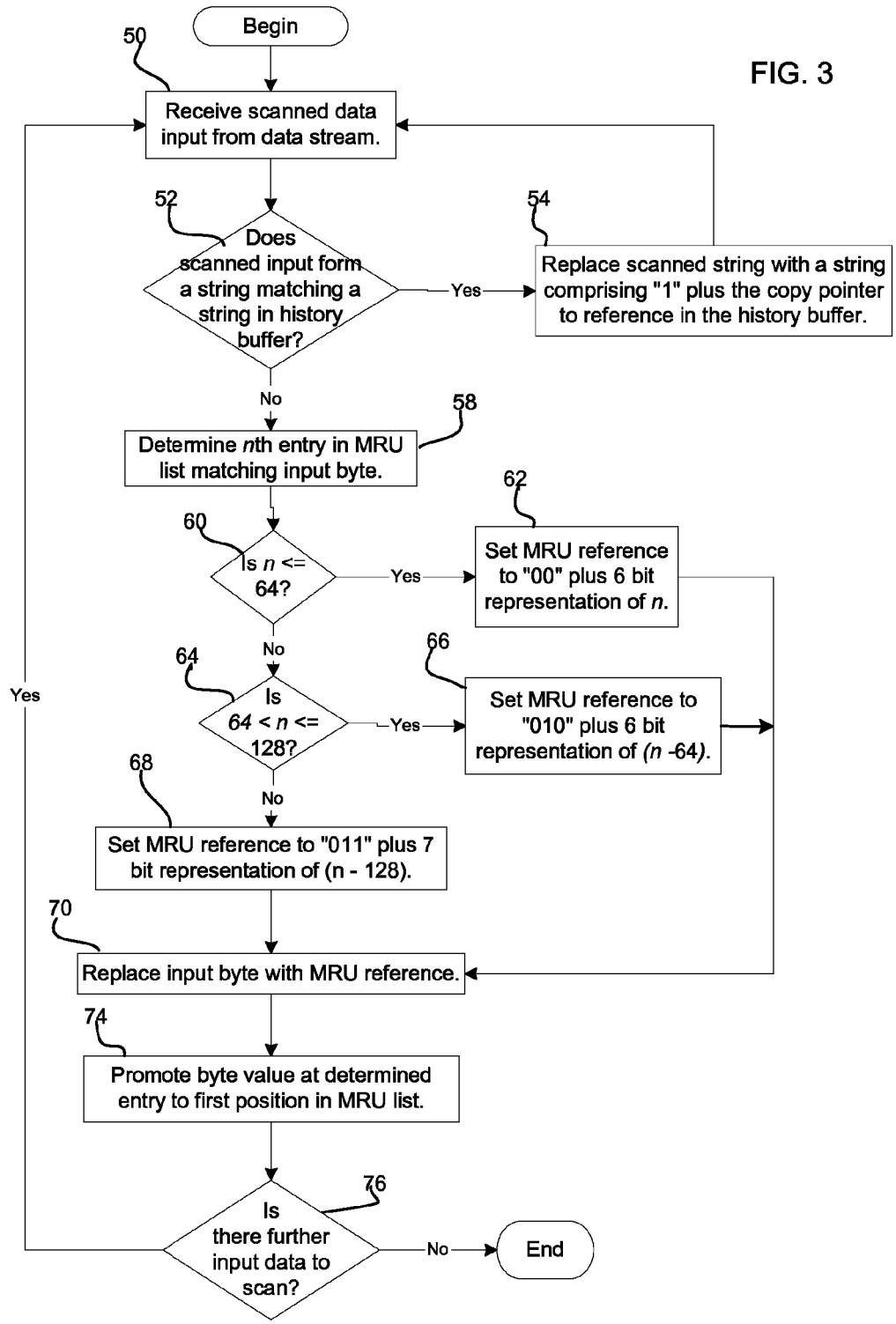
FIG. 3 illustrates logic to encode data in accordance with implementations of the invention.

FIG. 3 illustrates logic implemented in the encoder 4 to encode the input data 8 in accordance with the described implementations. Upon receiving (at block 50) data from the input data 8 stream, the encoder 4 uses LZ1 encoding techniques known in the art to determine (at block 52) whether the scanned input data forms a string that matches one previously scanned string in the history buffer 22. If so, the encoder 4 replaces (at block 54) the scanned string with a copy pointer to the matching string in the history buffer 22. The encoder 4 would update the history buffer 22 in a manner known in the art according to the LZ1 algorithm. Otherwise, if a byte is encountered which cannot be output as a continuation of a previous copy pointer referencing history buffer 22, or as a first byte of a new copy pointer, it is output by encoder 4 instead separately, in what is called a literal, as is shown in blocks 58 through 76. At block 58, the encoder 4 determines whether (at block 58) the nth entry in the MRU list 20 that matches the literal being considered. If (at block 60) n is less than 65, then the encoder 4 sets (at block 62) the MRU reference to "00" plus the six bit binary address of n, i.e., the offset of the entry in the first 64 entries of the MRU list 20. If (at block 64) n is between the 65 and 128, inclusive, then the encoder 4 sets (at block 66) the MRU reference to "010" plus the six bit binary address of n minus 64, which is the offset to the nth entry in the section of the MRU list 20 including the $65^{th}$ to $128^{th}$ entries. If (at block 64) the n is greater than 128, then the encoder 4 sets (at block 68) the MRU reference to "011" plus the seven bit binary address of n minus 128, which is the offset to the nth entry in the section of the MRU list 20 including the $129^{th}$ to $256^{th}$ entries. After setting the MRU reference, the encoder 4 replaces (at block 70) the literal with the MRU reference in the output data 12. The value at the nth entry in the MRU list 20 is then promoted (at block 74) to the first entry in the MRU list 20. Thus, future references to this value in the MRU list 20 will reference a different address due to the promotion. If (at block 76) there is further input data, control proceeds back to block 50 to scan and encode further input data.

To decode the encoded output data 12, the decoder 6 would set the MRU list 20 to the value of the MRU key 10 and the history buffer 22 to the initial value according to the LZ1 algorithm and then scan the output data 12. If the first bit of a reference code is "1", then the reference code is a copy pointer, whose data can be determined from the current state of the history buffer 22. If the first bits are one of the literal value indicators, e.g., "00", "010" or "011", then the decoder 6 would use the MRU reference to access the entry in the current MRU list 20 within the section of the MRU list 20 associated with the prepended value, i.e., the first 64 entries if the prepended value is "00", the second 64 entries if the prepended value is "010" and the last 128 entries if the prepended value is "011". In this way, the reference code for the literal is used to access the entry in the MRU list 20 and replace the MRU reference in the output data 12 with the value in the accessed MRU list 20 entry. The decoder 6 would perform the same actions as the encoder 4 in updating the MRU list 20 and the history buffer 22 while processing the output data 12. The decoder logic 6 would generate the decoded output data 16.

FIG. 4 illustrates logic implemented in the encoder 4 to allow a user to create an MRU key 10 that can be used as an encryption key to decrypt the output data 12. Control begins at block 100 with the encoder 4 receiving a request from a user to encode data. In response, the encoder 4 generates (at block 102) an MRU key 10 with 256 one byte entries including every possible binary permutation of an eight bit byte. The encoder 4 then rearranges (at block 104) the entries in the MRU key 10. The encoder 4 may user a random number or other random data to reorder the entries. The result is a randomized MRU key 10. Alternatively, the encoder 4 may receive a secret password from the user and use the value of the password to generate an ordering of the entries in the MRU key 10. The encoder 4 then returns (at block 106) the rearranged or generated MRU key 10 to the user. At block 108, the encoder 4 then encodes the data using the logic of FIG. 3 and the generated MRU key 10 and outputs (at block 110) the encoded data. The user may store the MRU key 10 for use to decode the data according to the logic of FIG. 5, or alternately just some password used to generate the key may be stored so that it can be regenerated for decryption Because the output data 12 was encoded using an unascertainable MRU key 10, the output data 12 is effectively encrypted, unless one can obtain the MRU key 10. FIG. 5 illustrates logic implemented in the decoder logic 6 to decode the output data 12. Control begins at block 150 where the decoder logic 6 receives a request to decode output data 12. The decoder logic 6 requests (at block 152) the MRU key 10 from the user. The user may provide the MRU key 10 on a removable medium, such as a diskette, memory stick, etc., accessible to the decoder 6. Alternatively, in implementations where the encoder logic 4 generated the MRU key 10 from a user password, the decoder logic 6 may request the password and generate the MRU key 10 from the user entered password. Upon receiving (at block 154) the MRU key 10 from the user, the decoder logic 6 then uses the received MRU key 10 to decode (at block 156) the output data 12 performing the inverse of the operations performed by the encoder 4 described with respect to FIG. 3 and generate (at block 158) decoded output data 16.

The described encoder logic 4 and decoder logic 6 may be utilized in many environments. For instance, a storage device, such as a tape drive or hard disk drive may include both the encoder 4 and decoder 6 logic to use to encode/encrypt and decode/decrypt data in the storage device, e.g., hard disk drive or tape cartridge. Alternatively, the encoder logic 4 may reside on one computer and the decoder logic 6 may reside on another computer, whereby a user at one computer would encode data and generate the MRU key 10, then transmit the MRU key 10 to a user at another computer including the decode logic 6 to use to decode/decrypt the data. For security purposes, the user may transfer the MRU key 10 on a removable storage device, e.g., diskette, memory stick, etc., to the other user. Alternatively, the user may encrypt the MRU key 10 with a password or using public/private key encryption and transfer to the other user, who would then decrypt the MRU key 10 using the password or asymmetric public/private key.

With the logic of FIGS. 4 and 5 both compression and encryption are accomplished in the same set of operations, such that the compressed output data 12 is effectively encrypted if third parties cannot ascertain the MRU key 10. The described implementations substantially improve the performance of a combination compression and encryption operation because the encoder logic does not need to separately compress the data and then separately encrypt the data. Instead, with the logic of FIGS. 4 and 5 both compression and encryption, as well as the inverse operations of decompression and decryption, are performed when scanning the input data, thereby requiring only one scan of the output data 12 to perform both compression/decompression and encryption/decryption.

Figure 6:
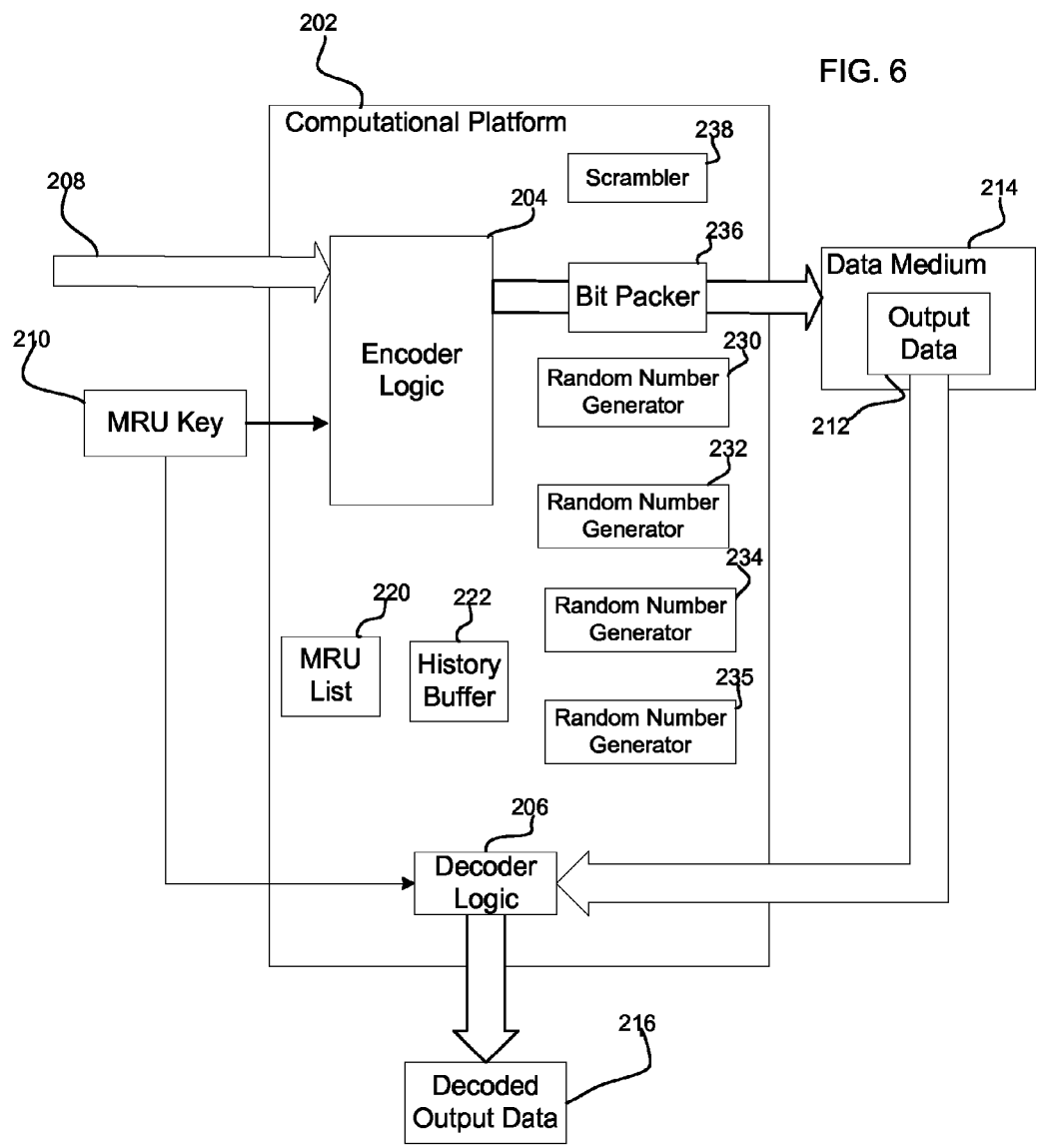
FIG. 6 illustrates an additional computing environment in accordance with the preferred embodiments of the present invention.

FIG. 6 illustrates a further implementation where additional operations are performed to further encrypt the input data to increase data security and further confound third parties improperly attempting to decode the data. The implementation of FIG. 6 includes all the components of FIG. 1 and additionally includes four random number generators (RNG) 230, 232, 234, and 235, which are used by the encoder 204, decoder 206, and bit packer 236. The random number generators 230, 232, 234, 235 implement pseudo random number generator algorithms known in the art. Further, a scrambler 238 performs scrambling operations in response to the value of an input pseudo random number from one of the random number generators 230, 232, 234, 235. A bit packer 236 gathers bits of the encoded data and packs the bits into N bit packages, such as 32 bit packages, to generate into the output data 212 in a manner known in the art.

Figure 7:
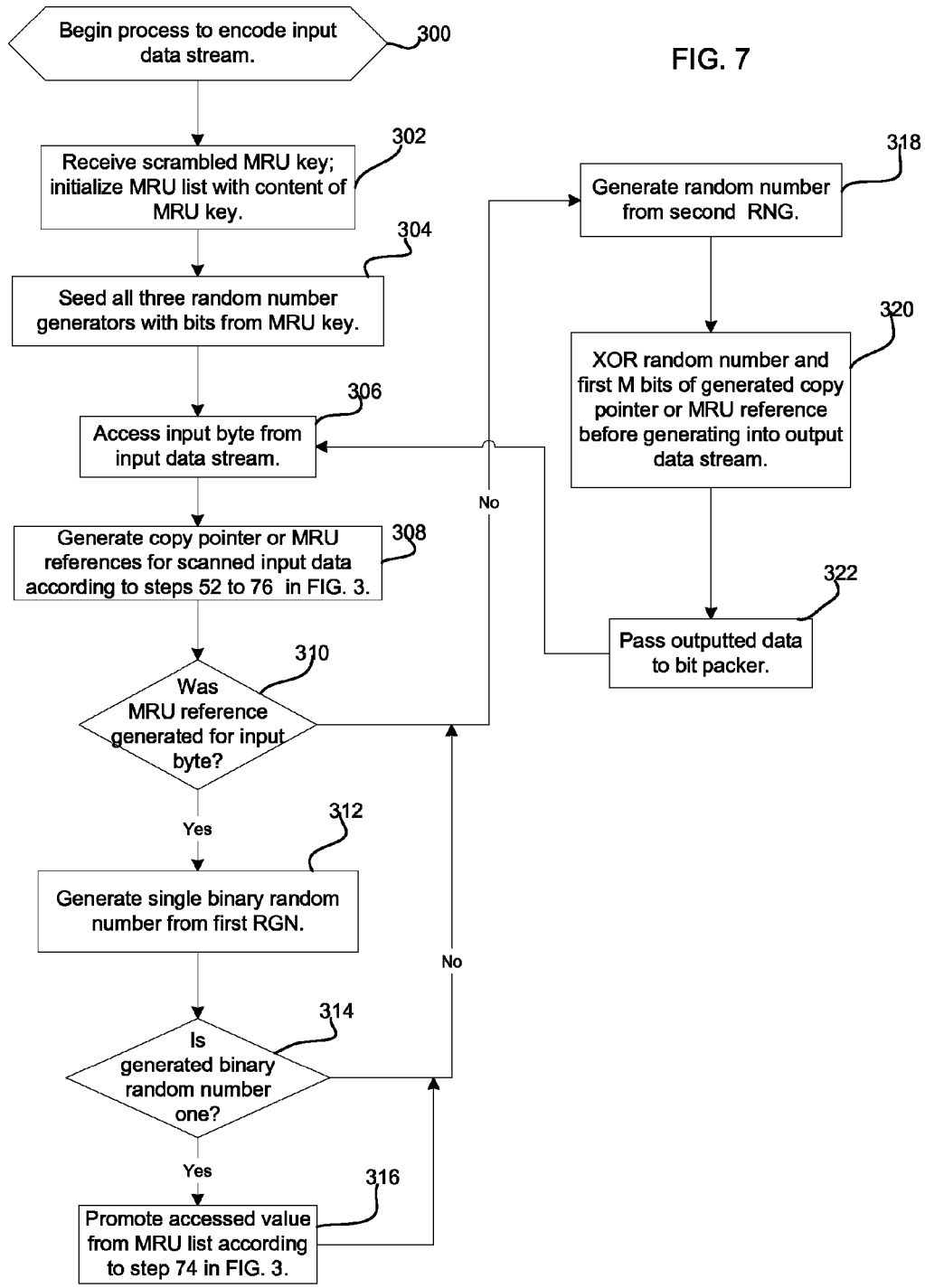
FIGS. 7 and 8 illustrate logic to encode data in accordance with implementations of the invention.

FIG. 7 illustrates logic implemented in the encoder 6, that uses many of the steps of FIG. 3 and the random number generators 230, 232, 234, and 235 to further encrypt the input data 208 during the compression operations in order to increase the security of the encoded output data 12. Control begins at block 300 where the encoder 204 begins the process of encoding the input data 208. The encoder 204 receives (at block 302) the scrambled MRU key 210, initializes the MRU list 220 with the content of the received MRU key 210, and seeds all four random number generators 230, 232, 234, and 235 with one or more bits from the MRU key 210. Seeding the pseudo random number generators 230, 232, 234, and 235 with the MRU key 210, which is itself secure, further obstructs third parties from decoding the output data 212. At block 206, the encoder 4 then scans a string from the input data stream 208 and generates (at block 308) a copy pointer or MRU reference for literals included in the string according to steps 52 through 66 in FIG. 3.

If (at block 310) an MRU reference was generated for a literal, then the encoder 204 generates (at block 312) a single binary random number from the first pseudo-random number generator. If (at block 314) the generated binary random number is one, then the encoder 204 performs step 74 in FIG. 3 to promote the accessed value to the top of the MRU list 220. Using the random number generator to determine whether to update the MRU list 220 makes the compressed data stream more difficult to decode than a simple cryptogram.

Otherwise, from the "no" branch of FIG. 314 or 316, the encoder 204 generates (at block 318) a random number from the pseudo random number generator 318. To provide an additional layer of security, the encoder 204 uses one (or more) pseudo random generators 232 to generate at least three bits (in block 318) which will be used in an exclusive OR (XOR) operation (at block 320) with at least M bits, where M is at least the first three bits of any output compression codeword in block 320, be that codeword a literal or copy pointer. In the limit all bits of every codeword are XOR'd with a pseudo-random number generator before that codeword is sent (at block 322) on to the bit packer. If there are further input bytes to process after handling the last byte, control proceeds back to block 306.

Figure 8:
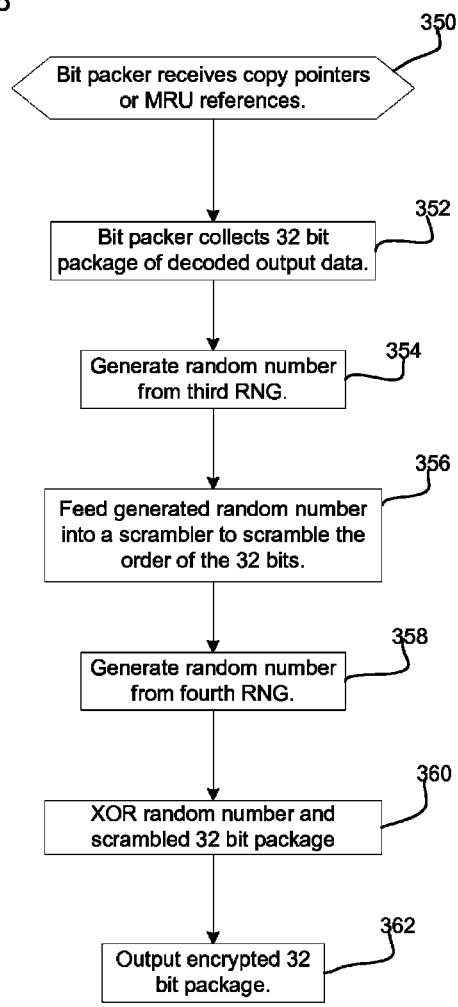

FIG. 8 illustrates the operations performed by the bit packer 236 upon receiving (at block 350) the copy pointers or MRU references from the encoder logic 204. The bit packer 236 collects (at block 352) compression codewords until N (e.g. 32, as will be assumed below) contiguous bits of the compressed data stream exist which can be output at one time. Certain special conditions, such as the end of a record, or operations may cause all bits in the bit packer to be output even when there are not 32 valid bits—in this case the as yet undefined bits can be set to some default value, such as binary '0's, or they can be set to some part of a random number. In either case, the output of the bit packer is 32 bit segments of the compressed data stream. Each 32 bit output of the bit packer is then encrypted in two ways.

First, random number generator (RNG) 234 generates (at block 354) a pseudo random number. The scrambler 238 rearranges (at block 356) the ordering of the 32 bits according to the value of the generated pseudo-random number, which may be different for each 32 bit scramble, in a manner known in the art. There are 32 factorial (32!) possible unique bit reorderings (scrambles) of any 32 bit word. However, in certain implementations, the scrambler 238 may only allow only a small subset of these. For instance, the number of allowed scrambles or orders may be defined by the number of possible combinations of the input pseudo-random number (e.g. if the pseudo-random number used to scramble the 32 bit package is itself 32 bits long then there are only roughly 4 billion scrambles possible. However, in the prior art, a simple any bit to any bit scrambler uses 80 bits, which can represent a huge number, though this is still a significantly smaller number than 32 factorial).

Second, random number generator (RNG) 235 generates a further random number that is XOR'd (at block 360) with the scrambled 32 bit package. Alternatively, the random number generator 234 may be used to generate the random number XOR'd with the scrambled 32 bit package. The combination of the scrambling in response to a pseudo-random number generated by 234 and the XOR generated by 235 is to create an encrypted compressed data stream. In further implementations, the scramble and XOR operations on the 32 bit package may be performed some number of times beyond the first time. In such implementations, a new pseudo-random can be used for each iteration by either re-use of the same random number generator to generate a new number, or by use of a separate random number generator. Similarly the scrambling and XOR'ing can be done with separate circuits or by re-use of the same circuits one further time per iteration.

Finally after the scramble and XOR operations have been performed some number of times, there are recording techniques such as those described in the LTO tape format, where locations within the decompressed data stream where decompression can begin, known as access points, are stored as the compressed data stream is created. These access points themselves can be encrypted such that the start locations within the compressed data stream are unknown. Similarly the valid data length within a data set denotes the end of a compressed data stream and this too can be encoded. Since access points and valid data lengths are typically recorded in an information table such as a Data Set Information Table (DSIT) in the LTO format, they can be software encrypted so that neither the start or stop location within data sets are known. These software encryptors can be pseudo-random number algorithms which use as a seed some set of bits or bytes gathered from the 256 byte key.

FIG. 9 illustrates logic implemented in the decoder 206 to use the same MRU key 10 and random number generators 230, 232, 234, and 235 to perform the inverse of the operations described with respect to FIGS. 7 and 8. In response to being invoked (at block 400), the decoder 206 would request and receive (at block 402) the MRU key 10 and seed the initial MRU list 220 with the content of the received MRU key 10. The four pseudo random number generators 230, 232, 234, and 235 are then seeded (at block 404) with sections from the MRU key 10 in the same manner performed at step 304 (FIG. 7). The encoded output data 212 is then parsed (at block 406) into 32 bit segments. The access points in the 32 bit segment are used (at block 408) to determine the start of each reference code, i.e., a copy pointer or MRU reference, in segment i. A loop is performed at blocks 410 through 428 for each 32 bit segment i. At block 412, the decoder logic 206 generates two random numbers from the third and fourth random number generators 234, 235 and performs an exclusive OR (XOR) of the random number and the 32 bit segment i to decode the 32 bit segment and obtain the access points therein.

For each segment i, a loop is performed at blocks 414 through 426 to decode/decrypt each reference code j in segment i. At block 416, the decoder 206 uses the second random number generator 232 to generate a random number and exclusive OR (XOR) with the first three bits of reference code j to enable determination as to whether the reference code j is a copy pointer, indicated by a "1" in the first bit or a MRU reference, indicated by a "00", "010" or "011" in the first three bits. If (at block 418) the first bit is a "1", then the decoder 206 treats the reference code as a copy pointer and uses (at block 420) the copy pointer to replace the reference code j with the referenced value in the history buffer 222 in a manner known in the LZ1 art. Otherwise, the decoder 206 performs (at block 422) the inverse of steps 56 to 66 in FIG. 3 to determine the referenced entry in the MRU list 220 and replace the reference code j with the byte at the determined entry. The decoder 206 would further generate (at block 424) a random number from the first pseudo random number generator 230 to determine whether to update the MRU list 220 by performing the inverse of steps 314 and 316 in FIG. 7.

The logic of FIGS. 7 and 8 provide further security by using the secret MRU key 10 to seed random number generators to further encrypt the copy pointers and MRU references. The above operations involving the use of pseudo random generators 230, 232, 234, 235 to further randomize the following information: the manner in which the MRU list 20 is updated; the first three bits of each copy pointer and MRU reference to prevent parsing the output data 12 stream to determine the start of each copy pointer or MRU reference; and randomizes the entire output of each 32 bit package. To further increase the strength of the encryption, each random number generator 230, 232, 234, and 235 may use a different pseudo random number generator algorithm. The logic of FIGS. 7 and 8 optimizes the encryption of the data by generating and using random numbers to encrypt data during the compression operations performed on a byte-by-byte basis.

The further techniques of the described implementations using random numbers requires knowledge of the decoder logic 206 and specific algorithms of the pseudo random number generators 230, 232, 234, and 235, as well as knowledge of which bits from the MRU key 10 are used to seed the random number generators, before decryption can even be attempted. Moreover, even if such knowledge of the operation of the decoder 206 could be obtained, a third party attempting to break the encryption performed by the logic of FIGS. 7 and 8 would still have to guess the value of the 256 byte MRU key, which has 256 factorial (256!) permutations.

Using the Generated MRU Encryption/Compression Key to Provide Security in a Data Storage System Once the MRU key 10 is generated, it may then be deployed to provide data security in a data storage system. For an individual user, once the MRU key 10 is generated, the individual user may store the key on a removable storage medium, e.g., diskette, storage cartridge, key chain storage devices (e.g., the Universal Serial Bus (USB) small hard drive that can fit in the pocket or attach to a key chain), etc. Alternatively, the individual user may further encrypt the MRU key 10 using a password protection scheme, such as the use of a user entered password as a key to encrypt and decrypt data in a manner known in the art. In alternative implementations, instead of maintaining the actual MRU key 10, the user may maintain a seed value used to generate the key, and then generate the MRU key 10 on demand from the seed value.

Figure 10:
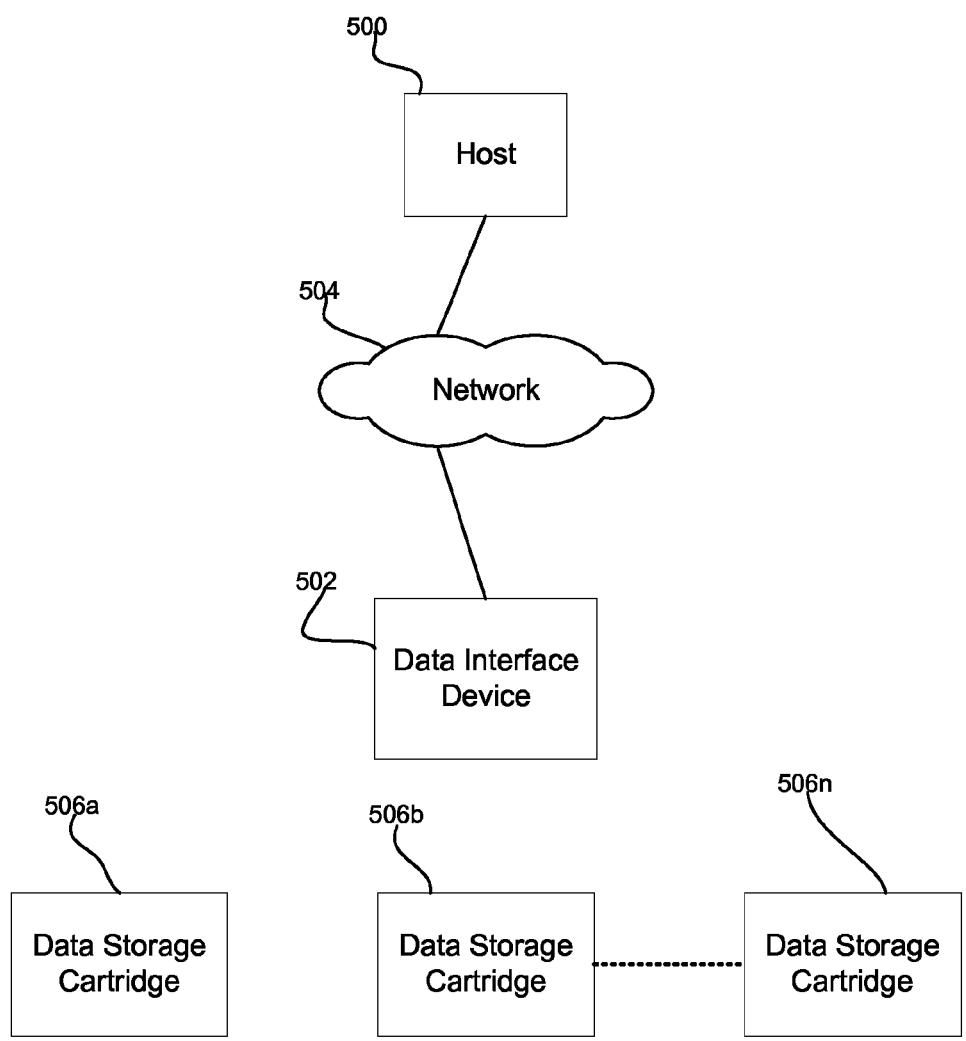
FIG. 10 illustrates a network storage environment in which a host accesses a data interface device and storage cartridges over a network in which aspects of the invention are implemented.

FIG. 10 illustrates a data storage computing environment including a host system 500 and a data interface device 502, such as a tape drive or optical drive that is capable of providing read/write access to one of a plurality of data storage cartridges 506a, b . . . n mounted in the interface device 502. The data interface device 502 may comprise any type of interface device or drive known in the art (e.g. tape drive, optical disk drive, hard disk drive interface, flash memory interface, Iomega drive interface, etc.) capable of reading and writing to any type of non-volatile storage medium. The data storage cartridges 506a, b . . . n may comprise any type of removable, non-volatile storage medium known in the art, such as a tape cassette (e.g. Linear Tape Open (LTO) format tape), optical disk, hard disk drive, Iomega removable disk (e.g., Zip Jaz** disk, etc.), flash memory card, etc. Additionally, the host 500 may be capable of communicating with numerous data interface devices 502 that are capable of mounting the same or different groups of data storage cartridges 506a, b . . . n.

The host 500 would transmit I/O requests to the data interface device 502 via a network 504, such as an Intranet, the Internet, a Local Area Network (LAN), Wide Area Network (WAN), Storage Area Network (SAN), etc., using any communication protocol known in the art, e.g., TCP/IP, Fibre Channel, Ethernet, etc. The host 500 may request to read or write data with respect to a volume that is stored on a particular data storage cartridge 506a, b . . . n. If the requested cartridge 506a, b . . . n is not currently mounted in the interface device 502, then the requested cartridge 504a, b . . . n would have to be mounted into the interface device 502. In a storage library system, such as with tape library systems known in the art, a robotic arm can access the storage cartridges 504a, b . . . n and mount and dismount storage cartridges 504a, b . . . n from the drive interfaces 502 to provide access to data on the storage cartridges 504a, b . . . n. Alternatively, a person can be alerted by the system to dismount and mount storage cartridges 504a, b . . . n into the drive.

To securely maintain the MRU keys in the storage system, described implementations utilize the public key cryptography standards. Public key cryptography utilizes a key pair comprising a public key and private key, and either can encrypt or decrypt data. A user maintains a private key and distributes public keys to others. One can send a secret message to a recipient by encrypting the message with the recipient's public key and then transmitting the message to the recipient because the private key is known only to the recipient of the message, whereas the public key is known to everyone. If the recipient protects the private key, then the recipient should be the only one able to decrypt the message using the private key. A public key algorithm is the algorithm used for encrypting and decrypting data with the public and private keys. Public key algorithms include the Rivest, Shamir, and Adleman (RSA) algorithm, or may include any public key encryption algorithm known in the art, such as Diffie and Hellman. Further details of public key encryption is described in the publication "An Overview of the PKCS Standards," RSA Laboratories Technical Note, by Burton S. Kaliski, Jr. (1993) and "Handbook of Applied Cryptography," by Alfred J. Menezes, Paul C. van Oorschot, and Scott A. Vanstone (1996), which publications are incorporated herein by reference in their entirety.

The following notation are used to describe encryption keys used with certain implementations of the invention.

$K_Y/J_Y$—upper case K and J are the public and private keys, respectively, of Y.

$[X]^Y$—the brackets indicate that the content X within the brackets is encrypted with the private key $J_Y$ of Y, the superscript;

$(X)^Y$—the parentheses indicate that the content X within the parentheses is encrypted with the public key $K_Y$ of Y.

Figure 11:
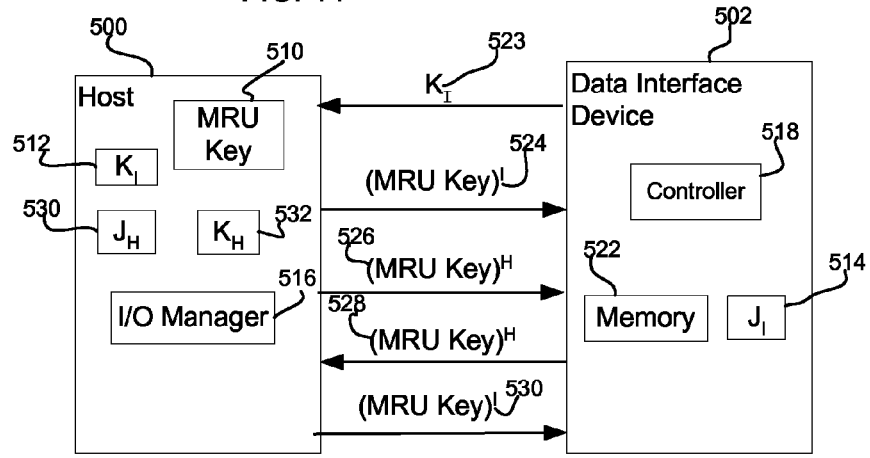
FIG. 11 illustrates a storage architecture in accordance with implementations of the invention.

FIG. 11 illustrates one implementation of how public/private keys may be deployed in the host 500 and data interface device 502. The host 500 generates a unique MRU key 510 comprising a unique 256 byte MRU key 10 to encode and decode data on at least one storage cartridge in the manner described above with respect to FIGS. 1 through 9 above. The host 500 further includes an interface device public key ($K_I$) 512 that is capable of encrypting data that can be decrypted by an interface private key ($J_I$) 514, where the interface device keys $J_I$ and $K_I$ are generated as a public/private key pair using public key encryption algorithms known in the art. The host 500 includes an I/O manager program 516 that handles I/O requests directed to the storage cartridges 506a, b . . . n and encrypts transmissions to the data interface device 502 to protect the MRU key 510.

Figure 12:
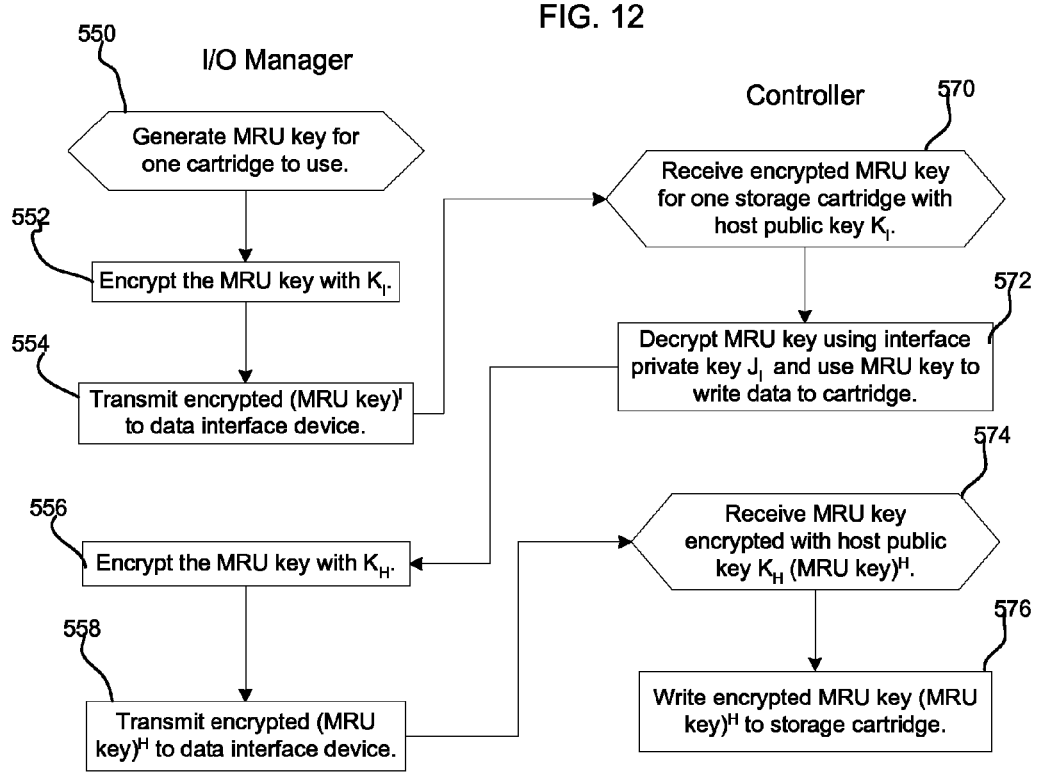
FIG. 12 illustrates logic to securely manage keys in the storage architecture of FIG. 11 in accordance with implementations of the invention.

FIG. 12 illustrates logic implemented in the I/O manager 516 (at blocks 550 to 556) and the controller (at block 570-572) to generate an MRU key 510 for use with at least one of the storage cartridges 506a, b . . . n. At block 550, the I/O manager 516 generates an MRU key 510, such as the key shown in FIG. 2b, and encrypts (at block 552) the MRU key 510 with the interface public key ($K_I$) 512 and transmits (at block 554) the encrypted (MRU key)$^I$ 524 to the data interface device 502. In certain implementations, the host 500 obtains the interface public key ($K_I$) 512 from the data interface device 502, or alternatively, the host 500 can generate the interface public/private key 512/514 pair itself.

Upon receiving (at block 570) the (MRU key)$^I$ 724 for a storage cartridge 506a, b . . . n, the controller 502 decrypts (at block 572) the encrypted (MRU key)$^I$ using the drive interface private key 514 ($J_I$), and may then use the MRU key 510 to encode data being written to the storage cartridge. The I/O manager 516 further encrypts (at block 556) the generated MRU key with the host public key 532 $K_H$ and transmits (at block 558) the encrypted (MRU Key)$^H$ 526 to the data interface device 502. Upon receiving (at block 574) the (MRU key)$^H$ 526 for one storage cartridge 506a, b . . . n, the controller 502 writes (at block 576) the encrypted (MRU key)$^H$ 526 to the storage cartridge 506a, b . . . n whose data is encrypted with that MRU key.

Figure 13:
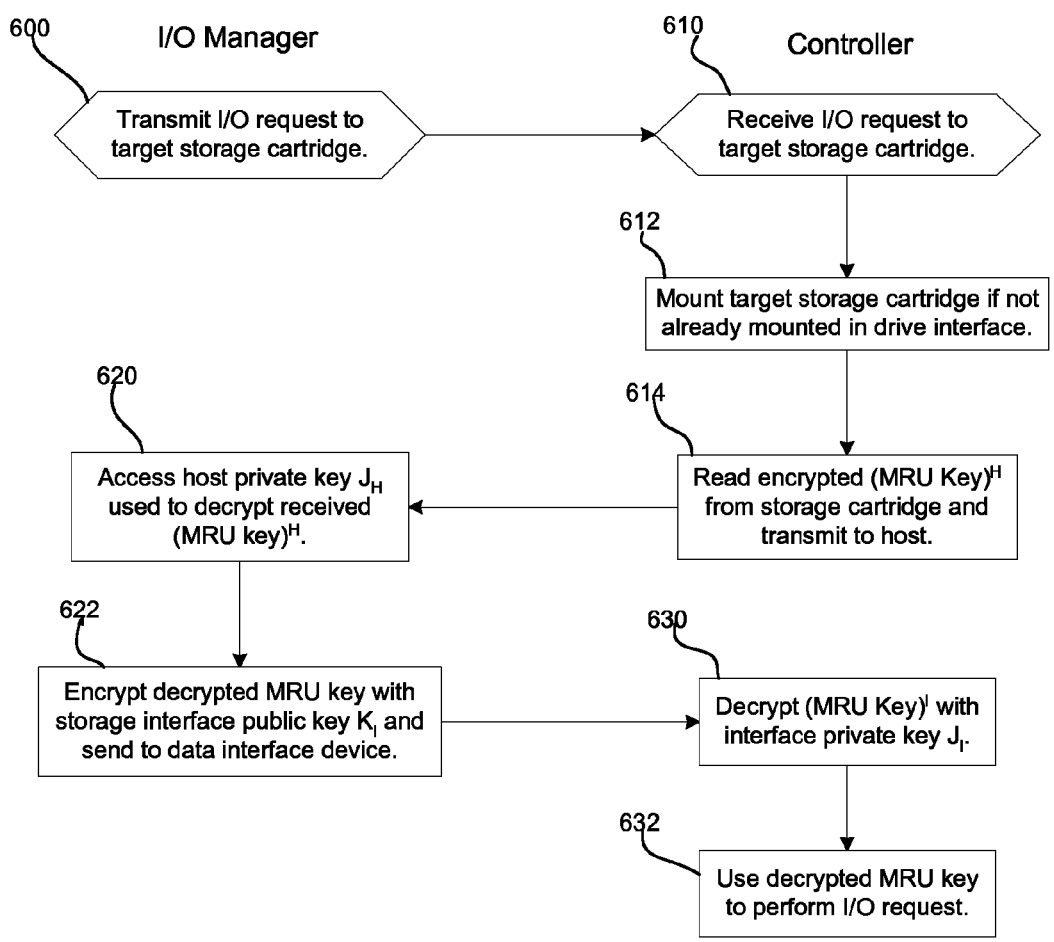
FIG. 13 illustrates an additional implementation of a storage architecture in accordance with implementations of the invention.

FIG. 13 illustrates logic implemented in the I/O manager 516 (at blocks 600, 620, and 622) and the controller 518 (at blocks 610-614, 630, and 632) to perform I/O operations using the MRU key 710 stored encrypted in the storage cartridge 506a, b . . . n to which the I/O request is directed. At block 600, the I/O manager 516 transmits an I/O request for the target storage cartridge 506a, b . . . n to the interface device 502. Upon receiving (at block 610) the I/O request, the interface device 502 mounts (at block 612) the target storage cartridge 506a, b . . . n if not already mounted. The controller 518 then reads (at block 614) the (MRU Key)$^H$ from the target storage cartridge 506a, b . . . n and transmits the encrypted (MRU Key)$^H$ 528 back to the host 500. Upon receiving the (MRU Key)$^H$ 528, the host 500 accesses (at block 620) the host private key $J_H$ that was used to decrypt the received (MRU Key)$^H$ 528. The host 500 then encrypts (at block 622) the MRU key 510 with the interface device public key 512 ($K_I$) and sends the encrypted (MRU Key)$^I$ 530 to the interface device 502.

Upon receiving the encrypted (MRU Key)$^I$ 530, the interface device 502 decrypts (at block 630) the encrypted (MRU Key)$^I$ 528 with the interface private key $J_I$ 514 and then uses (at block 632) the MRU key 510 to encode/decode the data to perform the I/O request to the target storage cartridge 506a, b . . . n.

With the implementation of FIGS. 11, 12, and 13, neither the host 500 nor the data interface device 502 needs to maintain information on the available MRU keys 510, which could be susceptible to access from a hacker. Instead, all the host 500 needs is its own host public/private key pair ($K_H/J_H$) 730/732 and the public key of each data interface device $K_I$ 512. Further, each cartridge 506a, b . . . n stores its own encrypted (MRU key)$^H$. The data interface device 502 would then access the encrypted (MRU key)$^H$ from the storage cartridge 506a, b . . . n to encode/decode data. Further, the host 500 needs only to maintain the public key of the data interface devices 502 and its own private key $J_H$ in order to decrypt a stored (MRU key)$^H$ and transmit the MRU key encrypted with the interface device public key The implementation of FIGS. 11, 12, and 13 is particularly useful for situations where there are multiple interface devices, each using a different public/private key pair. By encrypting the MRU key with the host public key ($K_H$), the encrypted (MRU key)$^H$ may be stored on the storage cartridge 506a, b . . . n and accessed and used by different interface devices 502 using different interface public/private key pairs. The host 500 may maintain the interface public key for each interface device for use when communicating with that device. Alternatively, all the interface devices of a median type, such as an LTO tape interface device, may share a single public/private key pair to allow the MRU key to be encrypted and stored on a storage cartridge using the interface public key, i.e., (MRU Key)$^I$, and be accessible to all the different interface devices using the same private key $J_I$.

Further, the interface public/private key for a given drive may be established and set at manufacturing and be unchangeable, and can either be unique for each drive or the same key across a same class of drives. Additionally, the interface public/private key in the drives may be modified in the field to allow customization. In such case, the drive may be designed to require some manual operation directly on the drive device to modify the key in order to prevent a hacker from remotely changing the key over a network.

Figure 14:
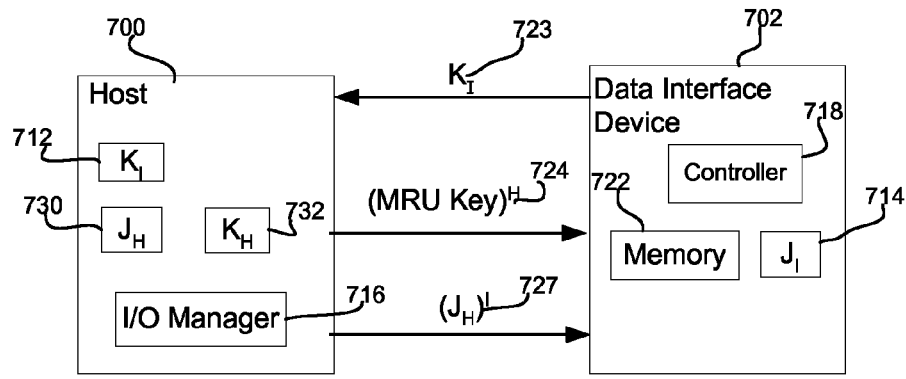
FIG. 14 illustrates logic to securely manage keys in the storage architecture of FIG. 13 in accordance with implementations of the invention.

FIG. 14 illustrates an additional implementation of the host 700 and data interface device 702. The host 700 includes the components 712, 716, 730, and 732 described with respect to the components 512, 516, 530, and 532 in the host 500 described in FIG. 11. The interface device 702 includes components 714, 718, and 722, described with respect to components 514, 518, and 522 in the interface device 502 described in FIG. 11. The host 700 may obtain the interface public key $K_I$ 723 or independently generate the interface public/private key pair 723. Additionally, the interface public/private key pairs 712, 714 can be set in the factory. Still further, a user may be able to manually reset the public/private key pair 712, 714.

Figure 15:
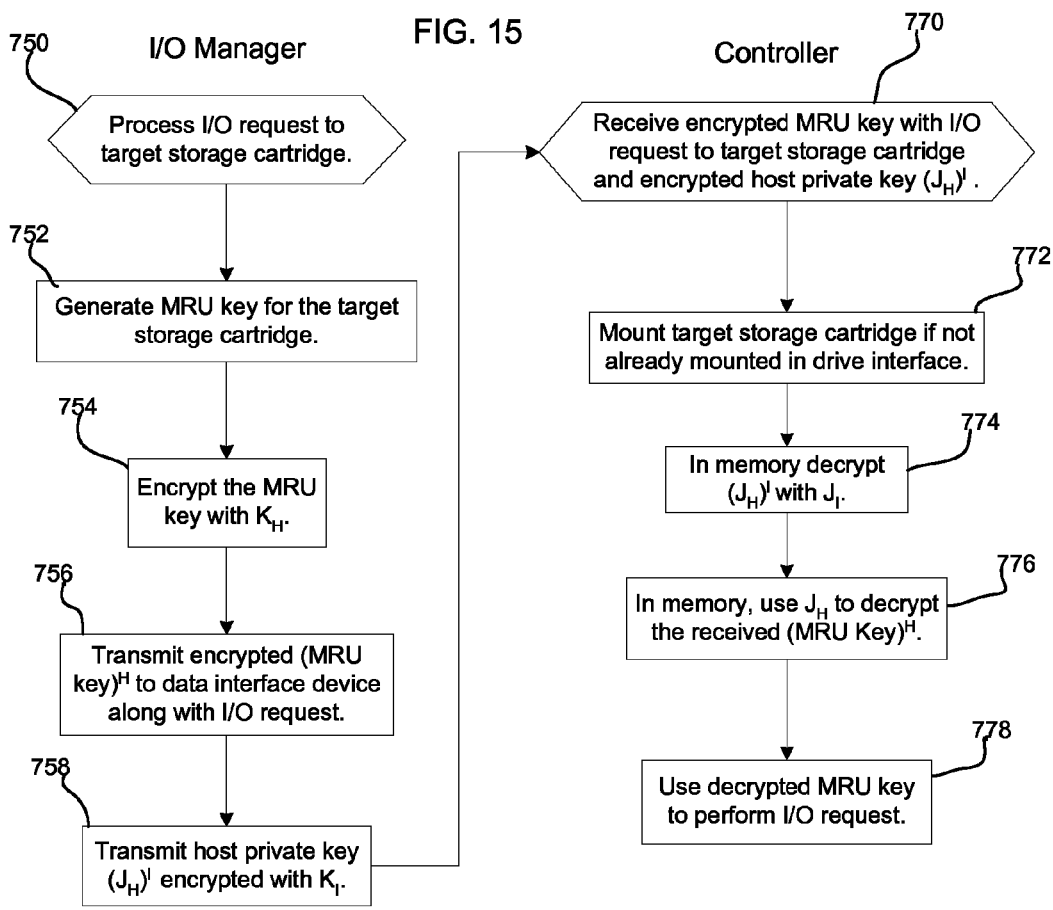
FIG. 15 illustrates an additional implementation of a storage architecture in accordance with implementations of the invention.

FIG. 15 illustrates logic implemented in the I/O manager 716 (at blocks 750 to 758) and interface controller 718 (at blocks 770 to 778) to provide the data interface device 702 with the MRU key 710 in a secure manner so that the controller 720 can use the MRU key 710 to encrypt/compress data in a storage cartridge 506a, b . . . n (FIG. 10). Blocks 750 to 758 are performed by the I/O manager 716 and blocks 770 to 778 performed by the interface controller 718. Control begins at block 750 when the I/O manager 716 processes an I/O request to one target storage cartridge 506a, b . . . n. The I/O manager 716 then generates (at block 752) an MRU key 710 for the target storage cartridge 506a, b . . . n. The generated MRU key 710 is then encrypted (at block 754) with the host public key $K_H$ 732 to produce (MRU Key)$^H$ 724 and transmitted (at block 756) to the interface device 702. The I/O manager 716 further transmits (at block 758) the host private key 730 encrypted with the interface public key 712, or $(J_H)^I$ 726, to the interface device 702.

Upon receiving (at block 770) the encrypted (MRU Key)$^H$ 724 and $(T_H)^I$ 726 and I/O request at block 770, the controller 718 mounts (at block 772) the target storage cartridge 506a, b . . . n in the interface device 702 if not already mounted. The controller 718 will then decrypt the encrypted host private key $(T_H)^I$ 726 with the interface private key $J_I$ in the memory 722 and then use the host private key $J_H$ 730 to decrypt (at block 776) the encrypted (MRU Key)$^H$ 724 in memory to produce the MRU key 710 to use to encrypt and/or decrypt data. The controller 718 then uses (at block 778) the MRU key 710 to encode or decode data to be written or read with respect to the target storage cartridge 705a, b . . . n.

In further implementations of FIGS. 14 and 15, upon receiving the encrypted (MRU Key)$^H$ 724, the controller 718 may store the encrypted (MRU Key)$^H$ 724 in the storage cartridge 506a, b . . . n, such as on the storage cartridge storage medium, e.g., the tape, or in a separate memory unit within the storage cartridge 506a, b . . . n housing, such as a cartridge memory mounted in a tape cartridge. Once the encrypted MRU key 710a, b . . . n is stored in the storage cartridge 506a, b . . . n, then the host 700 need only send data to the interface device 702 without having to send the MRU key 710. Upon receiving an I/O request, the interface device 702a, b . . . n may then request the host 700 to send the encrypted host private key $(J_H)^I$ 726 to use to decrypt the MRU key 710 to use to encode/decode data when performing the I/O operation. In still further implementations, the interface device 702 could store the encrypted host private key (V 726 in the storage cartridge 610a, b . . . n or within an erasable non-volatile memory of the controller 718 to use to decrypt the encrypted (MRU Key)$^H$ 724. In such further implementations, the interface device 702 would not have to request the host private key $J_H$. Still further, after decrypting the MRU key 724 using the host private key $J_H$, the controller 718 may store the MRU key encrypted with the interface public key $(K_I)$ for protection, and then decrypt using the interface private key $(J_I)$, when the MRU key 710 is needed to encode or decode the data in the storage cartridge 506a, b . . . n.

Figure 16:
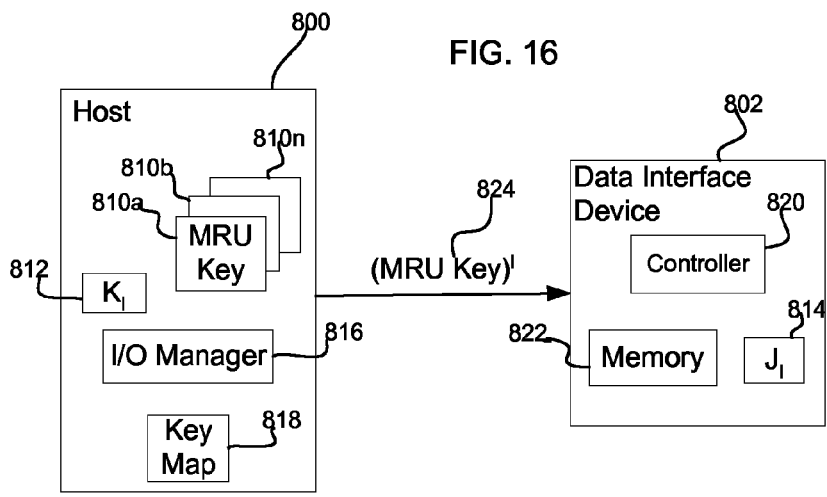
FIGS. 16 and 17 illustrate logic to securely manage keys in the storage architecture of FIG. 15 in accordance with implementations of the invention.

FIG. 16 illustrates one implementation of how public/private keys may be deployed in a host 800 and data interface device 802. The host 800 maintains a plurality of MRU keys 810a, b . . . n. The host 800 further includes an interface device public key $(K_I)$ 812 that is capable of encrypting data that can be decrypted by an interface private key $(J_I)$ 814 maintained by the interface device 802. The host 800 includes an I/O manager program 816 that handles I/O requests directed to the storage cartridges 506a, b . . . n and encrypts transmissions to the data interface device 802 to protect the MRU key 810. In certain implementations, the host 800 maintains a key map 818 that associates one MRU key 810a, b . . . n with each storage cartridge 506a, b . . . n. In this way, a separate MRU key 810a, b . . . n is generated for each storage cartridge 506a, b . . . n and needed by the data interface device 802 to encode/decode the associated storage cartridge 506a, b . . . n. This provides added security because discovery of the MRU key for one storage cartridge 506a, b . . . n would not compromise the security of the other storage cartridges 506a, b . . . n that require the use of entirely different MRU keys 810a, b . . . n to encode and decode. In alternative implementations, a single MRU key may be used for multiple storage cartridges 506a, b . . . n The data interface device 802 includes a controller 820 that manages I/O requests directed to one data storage cartridge 506a, b . . . n and a memory 822 for buffering data during processing operations. In the implementation of FIG. 16, the host 800 transmits (MRU key)$^I$ 824, which is the MRU key 810 encrypted using the interface device public key $(K_I)$ 812, to the data interface device 802.

Figure 17:
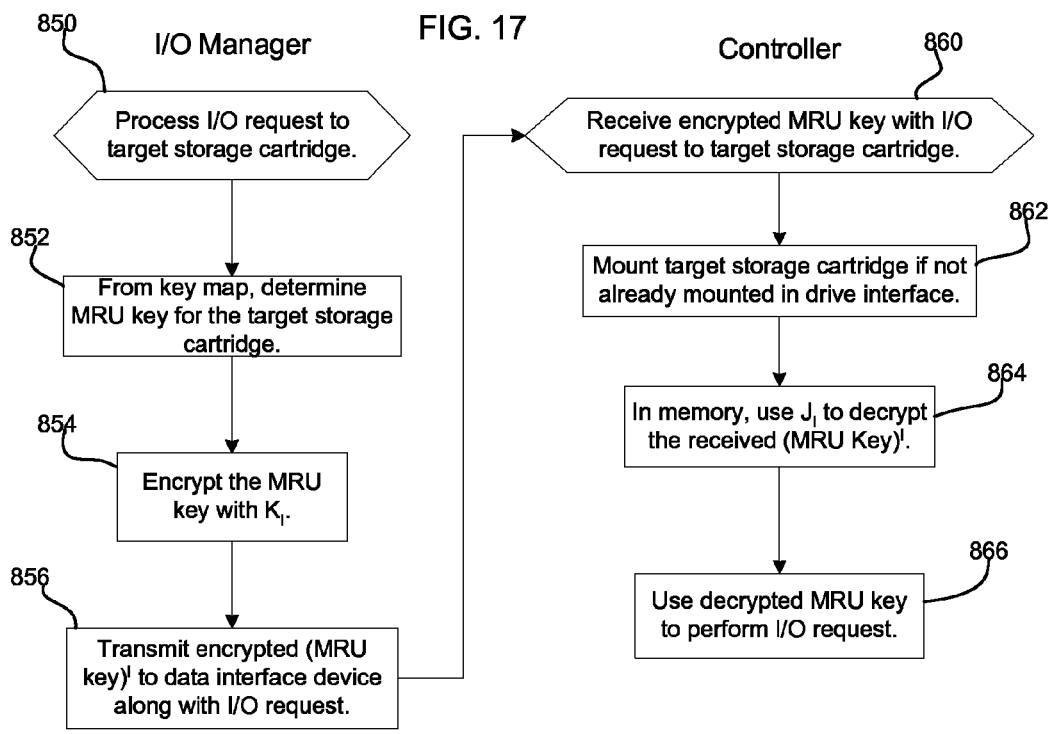

FIG. 17 illustrates logic implemented in the host I/O manager 816 (at blocks 850 to 856) and interface controller 820 (at block 860 to 866) to provide the data interface device 802 with the MRU key 810, a, b . . . n in a secure manner so that the controller 820 can use the MRU key 810a, b to encrypt/compress data to write to the storage cartridge 506a, b . . . n or decrypt/decompress data being read from the storage cartridge 506a, b . . . n. Control begins at block 850 with the I/O manager 816 processing an I/O request directed to one target storage cartridge 506a, b . . . n. The I/O manager 816 determines (at block 852) the MRU key 810a, b . . . n for the target storage cartridge 506a, b . . . n from the key map 818 that provides an association of MRU keys 810a, b . . . n to the storage cartridges 506a, b . . . n. The MRU key 810a, b . . . n is encrypted (at block 554) with the interface device public key $(K_I)$ to produce (MRU Key)$^I$ 824, which is transmitted (at block 856) to the data interface device 802.

Upon receiving (at block 860 in FIG. 17) the encrypted (MRU Key)$^I$ 824, the controller 820 mounts the target storage cartridge 806a, b . . . n into the interface device 802 if the target storage cartridge is not already mounted. The controller 820 will use (at block 864) the interface private key ($J_I$) to decrypt the encrypted (MRU Key)$^I$ 824 in the memory 822. The controller 820 will then use (at block 866) the decrypted MRU key 810a, b . . . n to execute the I/O request, i.e., encode data to write or decode data to read.

FIG. 18 illustrates a hardware implementation of the interface device 902 that provides further security and protection of the interface private key $J_I$ 914 to prevent someone from accessing the interface private key $J_I$ 914 in the interface device 920 to decrypt the MRU key 910 and use to misappropriate data from the data storage cartridge 506a, b . . . n. In the implementation of FIG. 18, the host 900 includes the components 910, 912, and 916 described with respect to the components 510, 512, and 516, respectively, in the host 500 described in FIG. 11. The interface device 902 includes components 914 and 920, described with respect to components 514 and 520, respectively, in the interface device 500 described in FIG. 11. In the described implementations, the host 900 transmits the encrypted (MRU key)$^I$ 924 to the interface device 902 to be decoded by the key decoder 932. The encrypted (MRU key)$^I$ 924 may be transmitted by the host 900 each time data is to be encoded or decoded or stored in the respected storage cartridge 506a, b . . . n for later access by the interface device 502 to encode and decode data if the same public/private key is used across all the drives. In the implementation of FIG. 18, the MRU key 910 is used to encrypt and decrypt data across multiple drives, such that tapes encrypted using the multiple drives have data encrypted with the same MRU key 910.

In the implementation of FIGS. 11 and 12, the MRU key may be encrypted with the host public key $K_H$, which the interface device 902 would return to the host 900 to have the host decrypt and return the encrypted (MRU key)$^I$ 924.

In FIG. 18, the interface device private key 914 ($J_I$) is written in a write once, read only memory 930, such as a programmable read only memory (PROM). A key decoder 932 hardware is capable of reading the private key 914 ($J_I$) from the PROM 930 and using the private key 914 ($J_I$) to decrypt the encrypted (MRU key)$^I$ 924 provided by the host 900. Thus, the key decoder 932 includes decryption algorithms for using the private key 914 ($J_I$) to decrypt a message encrypted with the public key 912 ($K_I$). The key decoder 932 would then transmit the MRU key 910 to encoder/decoder hardware 934 that includes encoder 936 and decoder 938 logic to encode and decode data on the storage cartridge 506a, b . . . n in the manner described above with respect to FIGS. 1-9.

In the implementation of FIG. 18, the controller 920 is unable to access the interface private key 914 ($J_I$) and only the key decoder hardware 932 can access the interface private key 914 ($J_I$). This arrangement would prevent unauthorized persons, such as hackers using a network, from accessing the interface private key 914 ($J_I$) for use in decrypting the MRU key 910 to misappropriate data in the storage cartridge 506a, b . . . n. Further, in implementations where the storage cartridge 506a, b . . . n maintains the encrypted (MRU key)$^I$ 924, the host 900 does not have to retransmit the encrypted MRU key 510a or any additional encryption related data every time the host 900 transmits an I/O request to the interface device 902.

The implementations of FIG. 11-18 provide different methodologies to enable the host 500 (FIG. 10) to securely provide the data interface device 502 with the MRU key to use to encode and decode data to the storage cartridge 506a, b . . . n. Further, with the described implementations, if the removable storage cartridge 506a, b . . . n is misappropriated, then the data therein is only accessible if a further key, such as the host or interface private keys, is additionally misappropriated to decrypt the encrypted MRU key. The described implementations provide further security because the key, such as the host or interface private keys, used to decrypt the encrypted MRU key is also securely maintained.

The described implementations further improve access time to the data in addition to providing data security because the MRU key can both decompress and decrypt data in the same operation when decoding the data from the storage cartridge. In this way, the described decoding methodology avoids the need to perform separate passes of decompression and then decryption of the data in order to provide both compression and encryption of data in the storage cartridge.

Additional Implementation Details

The described implementations of an encoder and decoder include a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The described security protocols of FIGS. 11-18 were used to provide the MRU key 10 discussed above with respect to FIGS. 1-9 to the data interface device 500 (FIG. 10). In alternative implementations, the key 510a, b . . . n used to encode/decode data in the storage cartridges 506a, b . . . n may utilize an encryption/decryption scheme that is different from the scheme described with respect to FIGS. 1-9.

In the described implementations, strings were replaced with copy pointers, or references to matching string values, and the remaining input data comprised literal bytes replaced with references to the MRU list. The literal may comprise more or less bits than a byte.

In the described implementations, the LZ1 algorithm was used to encode strings matching strings in the history buffer and an updateable MRU list was used to encode the literals. In alternative implementations, different compression algorithms may be used. For instance, LZ2 may be used to encode values matching a dictionary of entries. In LZ2 implementations, strings in the input data would be replaced with references to the dictionary instead of a copy pointer to a previous instance of the string in the history buffer. Still further, alternative compression algorithms may be used to code certain of the strings and the MRU list to encode other of the strings left as literals.

In the logic of FIGS. 7 and 8, random number generators were used to randomize output in four different instances. In alternative implementations, the discussed random number generators may be used in only one or two of the above described locations, or to randomize additional of the output data or operations.

In further implementations, additional encrypting operations may be performed using the described or additional random number generators. For instance, the encoder or software may encrypt access points and valid data lengths. Such encryption may involve scrambling data in response to generated pseudo-random numbers as well as XOR'ing the scrambled data with a further pseudo random number. Further, the scrambling and XOR combination may be repeated a number of times against the same item. Still further, an additional random number generator may be used to fill out padding bits and other bits which would otherwise go to some default. For instance, the displacement field of Copy Pointers output in the first 512 bytes from the beginning of a Compressed Data Stream or from an access point has one or more bits which must be '0' because the 10 bit Displacement field is addressing a valid history buffer which could logically be addressed by fewer bits—and thus the high order bit(s) are zero.

In the described implementations, the list used to encode the literals comprised an MRU list 20 (in FIG. 1 and list 220 in FIG. 6) where accessed entries were moved to the top of the list. In alternative implementations, the lists 20, 220 maintaining the 256 byte entries may be implemented in other manners than an MRU.

In the described implementations, the input data was encoded on a byte-by-byte basis. In additional implementations, strings having different bit lengths than a byte may be subject to the encoding operations.

In the described implementations, the MRU list 20 (in FIG. 1 and list 220 in FIG. 6) was updated to promote an accessed entry to the top of the list after replacing one byte with a reference to the entry in the MRU list 20, 220. In alternative implementations, the MRU list 20, 220 may not be updated during encoding and decoding operations, or updated in alternative manners.

The described implementations prepended specific bit values to the copy pointer and MRU reference to distinguish between the reference code an MRU reference. In alternative implementations, different bit values may be used to identify the reference codes.

The preferred logic of FIGS. 3-5, 7-9, 12, 14, 16, and 17 describe specific operations occurring in a particular order. In alternative implementations, certain of the logic operations may be performed in a different order, modified or removed. Moreover, steps may be added to the above described logic and still conform to the described implementations. Further, operations described herein may occur sequentially or certain operations may be processed in parallel.

Specific encryption and key transmission protocols and levels of encryption were described. However additional levels of encryption may be used for transmissions between the host 500 and data interface device 502. Further, encryption schemes other than the private/public key method may be used.

In described implementations, the host 500 transmitted the MRU key in encrypted form to the data interface device 502. In alternative implementations, the host 500 may transmit a seed number instead of the MRU key that the data interface device 502 would use to generate the MRU key.

In the described implementations, the interface device 502 used the MRU key to perform the encoding and decoding of data. In alternative implementations, the host may encode the data and transmit the encoded data to the drive interface 502 to write to the storage cartridge 506a, b . . . n and access the encoded data form the storage cartridge 506a, b . . . n via the interface device and use the MRU key to decode the encoded data. In such implementations, the host 500 may maintain the MRU key encrypted using its own host public ($K_H$) and private key ($J_H$) pair. Only when the MRU key is needed to access the data would the host 500 then decrypt the encrypted MRU key, i.e., (MRU Key)$^H$ and use the key to encode or decode data at the storage cartridge 506a, b . . . n.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for accessing data in a read/write storage medium within one of a plurality of storage cartridges mounted into a plurality of interface devices, comprising:

providing an association of at least one coding key to the plurality of storage cartridges, wherein the at least one coding key comprises a Most Recently Used (MRU) key generated by scrambling a list of entries in a random manner, wherein the MRU key initially comprises a list of every possible byte value scrambled in the random manner;

encrypting the at least one coding key and storing the encrypted at least one coding key in at least one of the storage cartridges;

receiving, by a receiving interface device comprising one of the plurality of interface devices, an Input/Output (I/O) request to a target storage cartridge comprising one of the plurality of storage cartridges, wherein the receiving interface device has a controller comprising at least one of hardware logic in a hardware device and a processor that executes logic or code to perform operations;

mounting, by the receiving interface device, the target storage cartridge in response to the I/O request;

reading, by the receiving interface device, the encrypted coding key from the mounted target storage cartridge;

transmitting, by the receiving interface device, the read encrypted coding key to a host;

receiving, by the receiving interface device, a host encrypted coding key encrypted with an encryption key of the receiving interface device, wherein the host encrypted coding key comprises the encrypted coding key, transmitted by the interface device to the host, which is decrypted by the host and re-encrypted by the host with the encryption key of the receiving interface device;

decrypting, by the receiving interface device, the host encrypted coding key to produce the coding key to use for the I/O request;

performing a read or write operation in response to the I/O request by decoding read data or coding write data using the coding key; and performing, by the receiving interface device, read and write operations for multiple subsequent I/O requests by using, by the receiving interface device, the coding key to decode read data and code write data for multiple subsequent I/O requests to the target storage cartridge, wherein the coding key comprising the MRU key is used to encode data by replacing literals in the data with a pointer to a matching entry in the MRU key.

2. The method of claim 1, wherein the association of the at least one coding key to the plurality of storage cartridges associates one key with the plurality of storage cartridges, wherein the one key encodes data written to storage mediums and decodes data read from the storage mediums of the plurality of storage cartridges.

3. The method of claim 1, wherein the association of the at least one coding key to the plurality of storage cartridges associates a different key with each storage cartridge, wherein the key associated with one storage cartridge is used to encode data written to the storage medium and decode data read from the storage medium of the storage cartridge.

4. The method of claim 1, wherein the coding key comprises a seed value that is used to generate an additional key that is used to directly decode and encode the data in the storage medium in the storage cartridge.

5. The method of claim 1, wherein encrypting the coding key further comprises:
encrypting, by the host, the coding key with a first key to produce the host encrypted coding key, wherein the interface devices use a second key to decrypt the coding key encrypted with the first key.

6. The method of claim 1, wherein encrypting the coding key further comprises:
encrypting the coding key with a first key, wherein the host uses a second key to decrypt the coding key encrypted with the first key, wherein the host encrypts the coding key by encrypting the coding key with a third key, wherein the interface devices uses a fourth key to decrypt the coding key encrypted by the host with the third key.

7. The method of claim 1, wherein the storage cartridges comprise tape media and the data on the storage cartridges coded and decoded using the at least one coding key comprises archival data.

8. The method of claim 6, wherein the first key comprises a host public key, wherein the second key comprises a host private key, wherein the third key comprises an interface device public key and wherein the fourth key comprises an interface device private key.

9. A system for accessing data in a read/write storage medium within one of a plurality of storage cartridges and to communicate with a host, comprising:
an interface device having a controller for performing operations, wherein the controller comprises at least one of hardware logic in a hardware device and a processor that executes logic or code to perform operations, the operations comprising:
receiving an Input/Output (I/O) request to a target storage cartridge comprising one of the plurality of storage cartridges, wherein at least one coding key is associated with the plurality of storage cartridges, wherein encrypted coding keys are stored in the storage cartridges, wherein the coding key comprises a Most Recently Used (MRU) key generated by scrambling a list of entries in a random manner, wherein the MRU key initially comprises a list of every possible byte value scrambled in the random manner;
mounting the target storage cartridge in response to the I/O request;
reading the encrypted coding key from the mounted target storage cartridge;
transmitting the read encrypted coding key to the host;
receiving a host encrypted coding key encrypted with an encryption key of the interface device, wherein the host encrypted coding key comprises the encrypted coding key, transmitted by the interface device to the host, which is decrypted by the host and re-encrypted by the host with the encryption key of the interface device;
decrypting the host encrypted coding key to produce the coding key to use for the I/O request;
performing a read or write operation in response to the I/O request by decoding read or coding write data using the coding key; and
performing read and write operations for multiple subsequent I/O requests by using the coding key to decode read data and code write data for multiple subsequent I/O requests to the target storage cartridge, wherein the coding key comprising the MRU key is used to encode data by replacing literals in the data with a pointer to a matching entry in the MRU key.

10. The system of claim 9, wherein an association of the at least one coding key to the plurality of storage cartridges associates one key with the plurality of storage cartridges, wherein the one key encodes data written to storage mediums and decodes data read from the storage mediums of the plurality of storage cartridges.

11. The system of claim 9, wherein the association of the at least one coding key to the plurality of storage cartridges associates a different key with each storage cartridge, wherein the key associated with one storage cartridge is used to encode data written to the storage medium and decode data read from the storage medium of the storage cartridge.

12. The system of claim 9, wherein encrypting the coding key further comprises:
encrypting, by the host, the coding key with a first key, wherein the interface devices use a second key to decrypt the coding key encrypted with the first key.

13. The system of claim 9, wherein encrypting the coding key further comprises:
encrypting the coding key with a first key, wherein the host uses a second key to decrypt the coding key encrypted with the first key, wherein the host encrypts the coding key by encrypting the coding key with a third key, wherein the interface devices uses a fourth key to decrypt the coding key encrypted by the host with the third key.

14. The system of claim 9, wherein the storage cartridges comprise tape media and the data on the storage cartridges coded and decoded using the at least one coding key comprises archival data.

15. The system of claim 13, wherein the first key comprises a host public key, wherein the second key comprises a host private key, wherein the third key comprises an interface device public key and wherein the fourth key comprises an interface device private key.

16. An article of manufacture comprising at least one of a non-transitory computer readable storage media including code for an Input/Output (I/O Manager) and hardware device controller that when executes accesses data in a read/write storage medium within one of a plurality of storage cartridges mounted into a plurality of interface devices, to communicate with a host, and to perform operations, the operations comprising:
providing, by the I/O manager, an association of at least one coding key to the plurality of storage cartridges, wherein the at least one coding key comprises a Most Recently Used (MRU) key generated by scrambling a list of entries in a random manner, wherein the MRU key initially comprises a list of every possible byte value scrambled in the random manner;

encrypting, by the I/O manager, the coding keys and storing the encrypted coding keys in the storage cartridges;

receiving, by the controller, an Input/Output (I/O) request to a target storage cartridge comprising one of the plurality of storage cartridges;

mounting, by the controller, the target storage cartridge in response to the I/O request;

reading, by the controller, the encrypted coding key from the mounted target storage cartridge;

transmitting, by the controller, the read encrypted coding key to the host;

receiving, by the controller, a host encrypted coding key encrypted with an encryption key of an interface device, wherein the host encrypted coding key comprises the encrypted coding key, transmitted by the interface device to the host, which is decrypted by the host and re-encrypted by the host with the encryption key of the interface device;

decrypting, by the controller, the host encrypted coding key to produce the coding key to use for the I/O request;

performing, by the controller, a read or write operation in response to the I/O request by decoding read or coding write data using the coding key; and performing, by the controller, read and write operations for multiple subsequent I/O requests by using, by the controller, the coding key to decode read data and code write data for multiple subsequent I/O requests to the target storage cartridge, wherein the coding key comprising the MRU key is used to encode data by replacing literals in the data with a pointer to a matching entry in the MRU key.

17. The article of manufacture of claim 16, wherein the association of the at least one coding key to the plurality of storage cartridges associates one key with the plurality of storage cartridges, wherein the one key encodes data written to storage mediums and decode data read from the storage mediums of the plurality of storage cartridges.

18. The article of manufacture of claim 16, wherein the association of the at least one coding key to the plurality of storage cartridges associates a different key with each storage cartridge, wherein the key associated with one storage cartridge is used to encode data written to the storage medium and decode data read from the storage medium of the storage cartridge.

19. The article of manufacture of claim 16, wherein the coding key comprises a seed value that is used to generate an additional key that is used to directly decode and encode the data in the storage medium in the storage cartridge.

20. The article of manufacture of claim 16, wherein encrypting the coding key further comprises:

encrypting, by the I/O manager, the coding key with a first key, wherein the controller uses a second key to decrypt the coding key encrypted with the first key.

21. The article of manufacture of claim 16, wherein encrypting the coding key further comprises:

encrypting the coding key with a first key, wherein the host uses a second key to decrypt the coding key encrypted with the first key, wherein the host encrypts the coding key by encrypting the coding key with a third key, wherein the controller uses a fourth key to decrypt the coding key encrypted by the host with the third key.

22. The article of manufacture of claim 16, wherein the storage cartridges comprise tape media and the data on the storage cartridges coded and decoded using the at least one coding key comprises archival data.

\* \* \* \* \*